United States Patent [19]
Kikuchi et al.

[11] Patent Number: 6,163,414
[45] Date of Patent: Dec. 19, 2000

[54] IMAGE READING APPARATUS

[75] Inventors: Michio Kikuchi; Yoshiya Imoto, both of Ebina, Japan

[73] Assignee: Fuji Xerox Co., Ltd., Tokyo, Japan

[21] Appl. No.: 09/170,163

[22] Filed: Oct. 13, 1998

[30] Foreign Application Priority Data

Oct. 20, 1997 [JP] Japan ..................................... 9-286317
Sep. 10, 1998 [JP] Japan ................................... 10-256615

[51] Int. Cl.⁷ .................................................. G02B 9/36
[52] U.S. Cl. ............................ 359/776; 359/778; 399/8; 399/72
[58] Field of Search ................................... 359/776, 778; 399/8, 72, 39

[56] References Cited

U.S. PATENT DOCUMENTS

| | | | |
|---|---|---|---|
| 4,450,358 | 5/1984 | Reynolds | 250/492.1 |
| 4,863,251 | 9/1989 | Herloski et al. | 350/471 |
| 5,617,252 | 4/1997 | Manhart et al. | 359/653 |
| 5,646,788 | 7/1997 | Bietry | 359/740 |

FOREIGN PATENT DOCUMENTS 9-113802   5/1997   Japan .

*Primary Examiner*—Georgia Epps
*Assistant Examiner*—Tim Thompson
*Attorney, Agent, or Firm*—Oliff & Berridge, PLC

[57] ABSTRACT

An image reading apparatus includes: illuminating means for illuminating an original with light; a lens forming an image of reflected light from the original, the lens having a resolution characteristic in which a resolution in a vertical scanning direction in an image-reading wavelength region at a field angle in a vicinity of an end of the original is lower than a minimum resolution in an image-reading wavelength region at a field angle on an inner side of the vicinity-of the end of the original; light shielding means for shielding part of the reflected light such that a pupil diameter in the vertical scanning direction in the reflected light from the vicinity of the end of the original is reduced; and photoelectrically converting means for converting the reflected light partly shielded by the light shielding means and undergone image formation by the lens into an electrical signal.

12 Claims, 11 Drawing Sheets

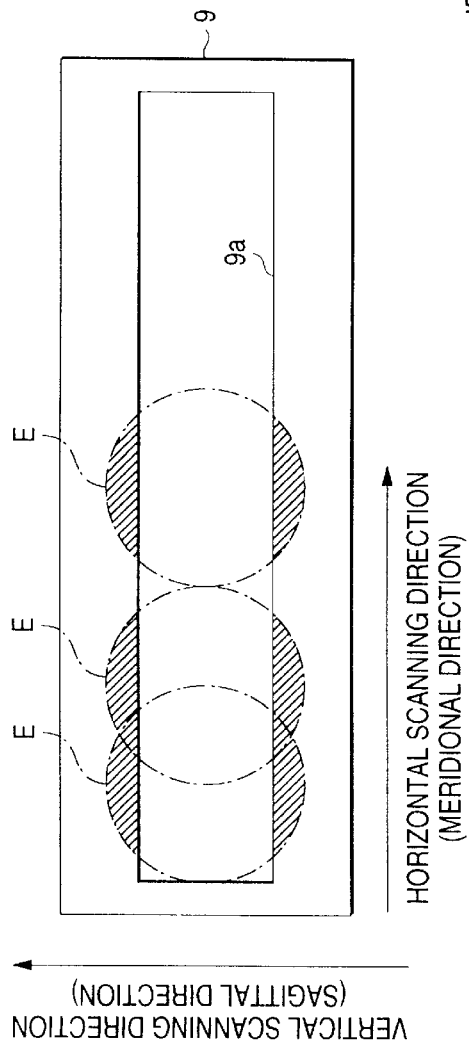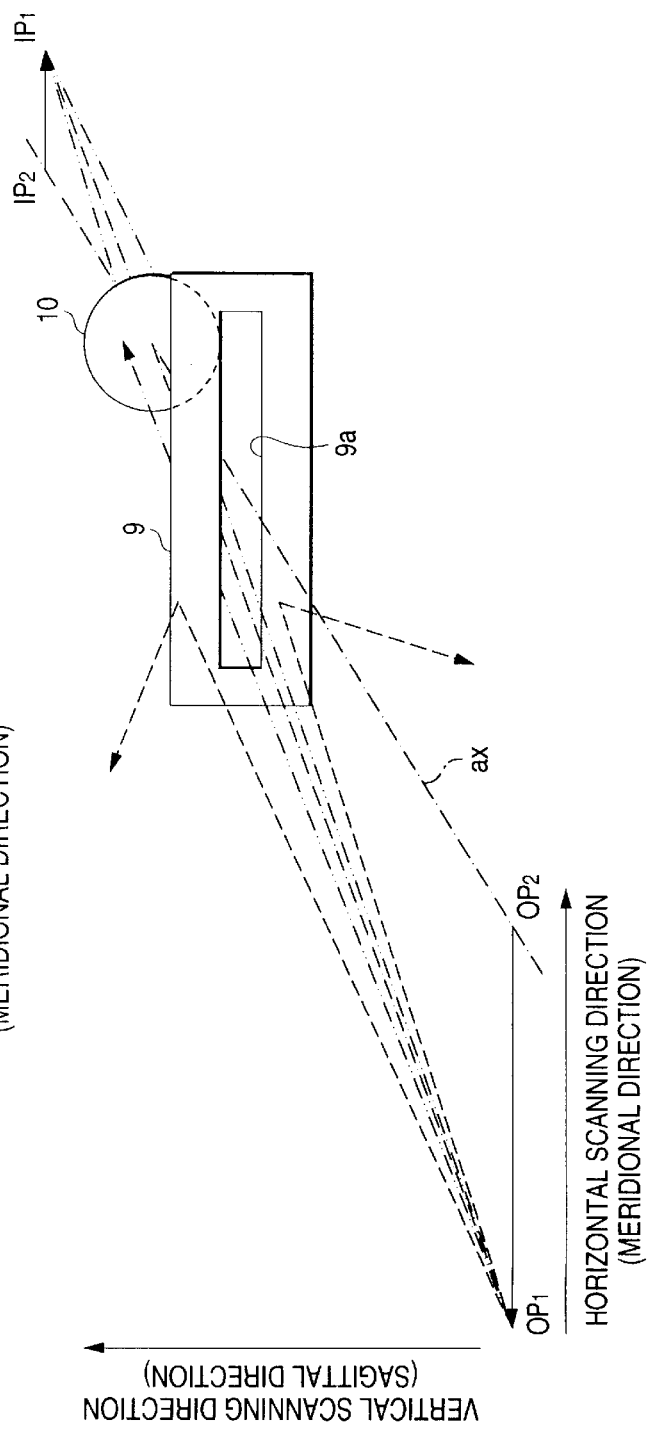

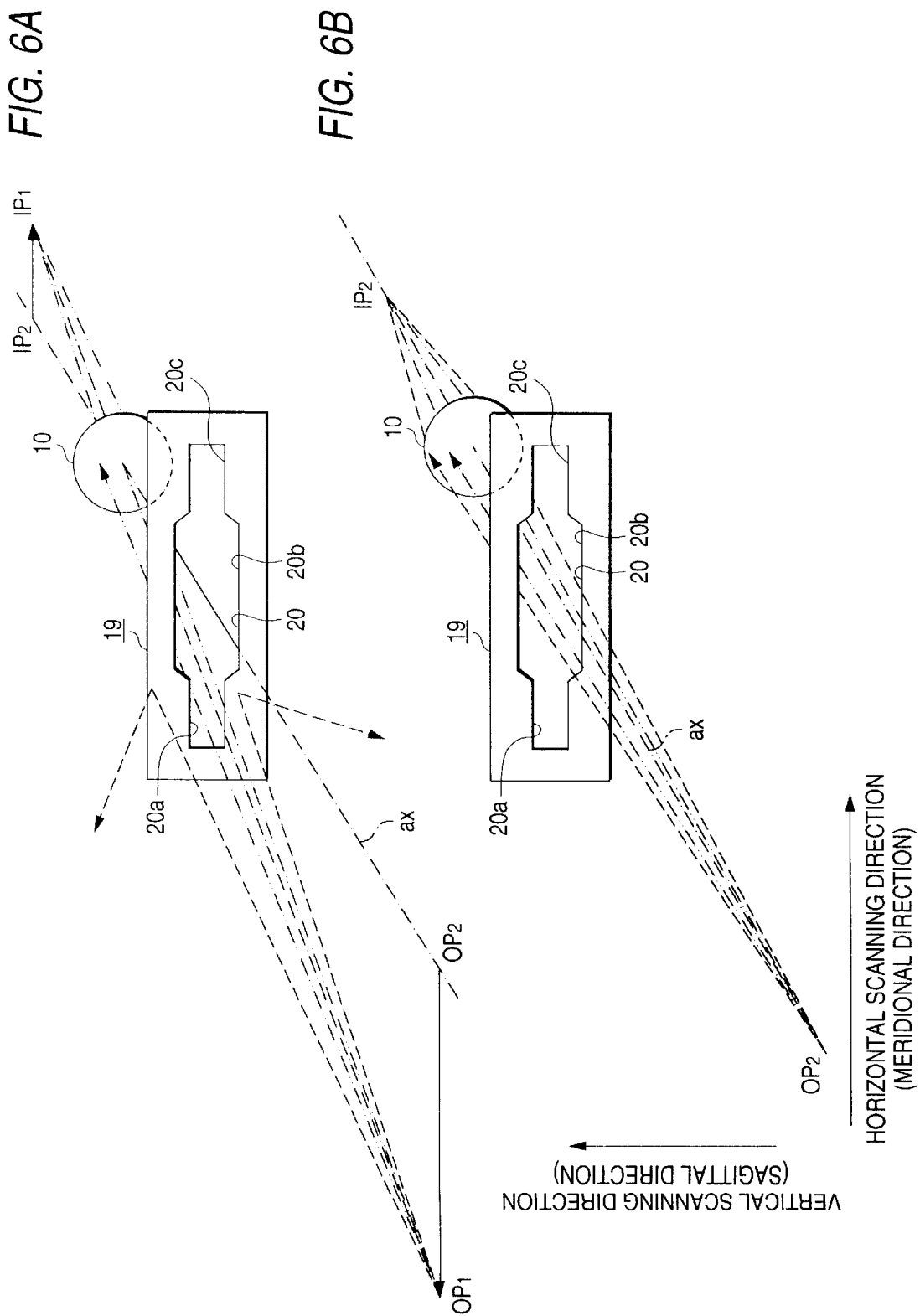

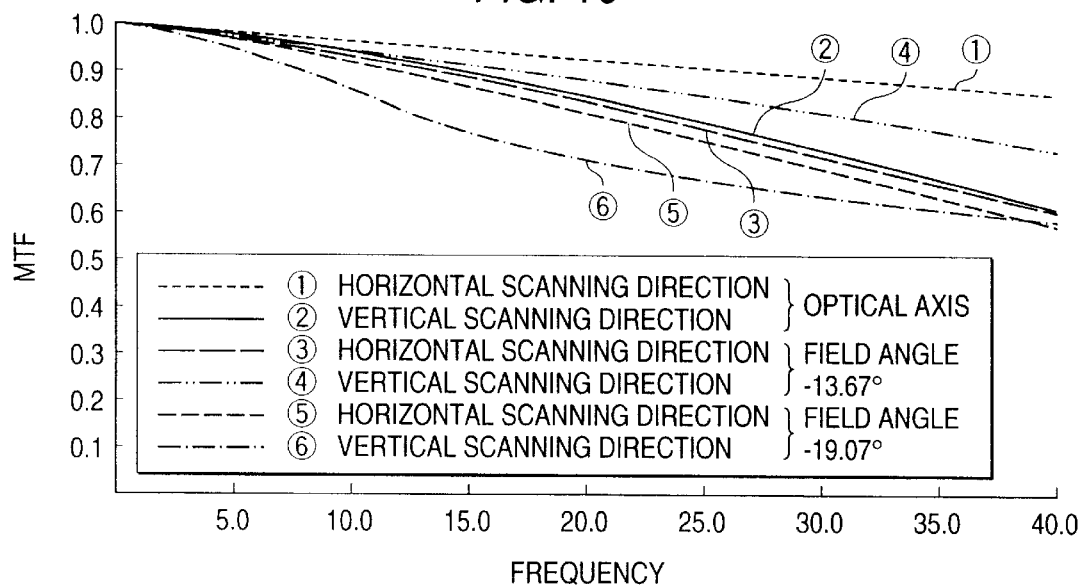
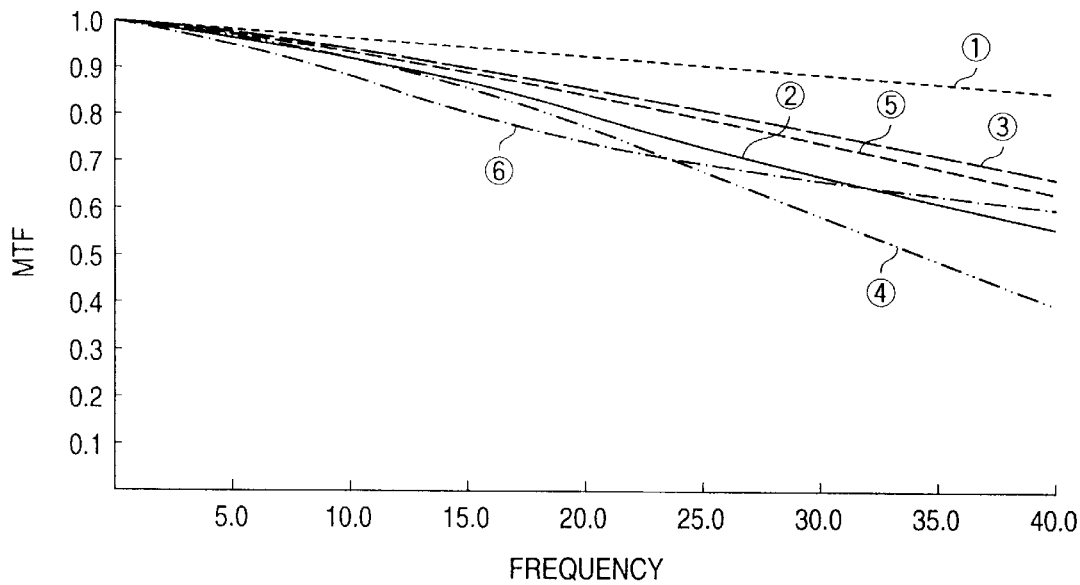

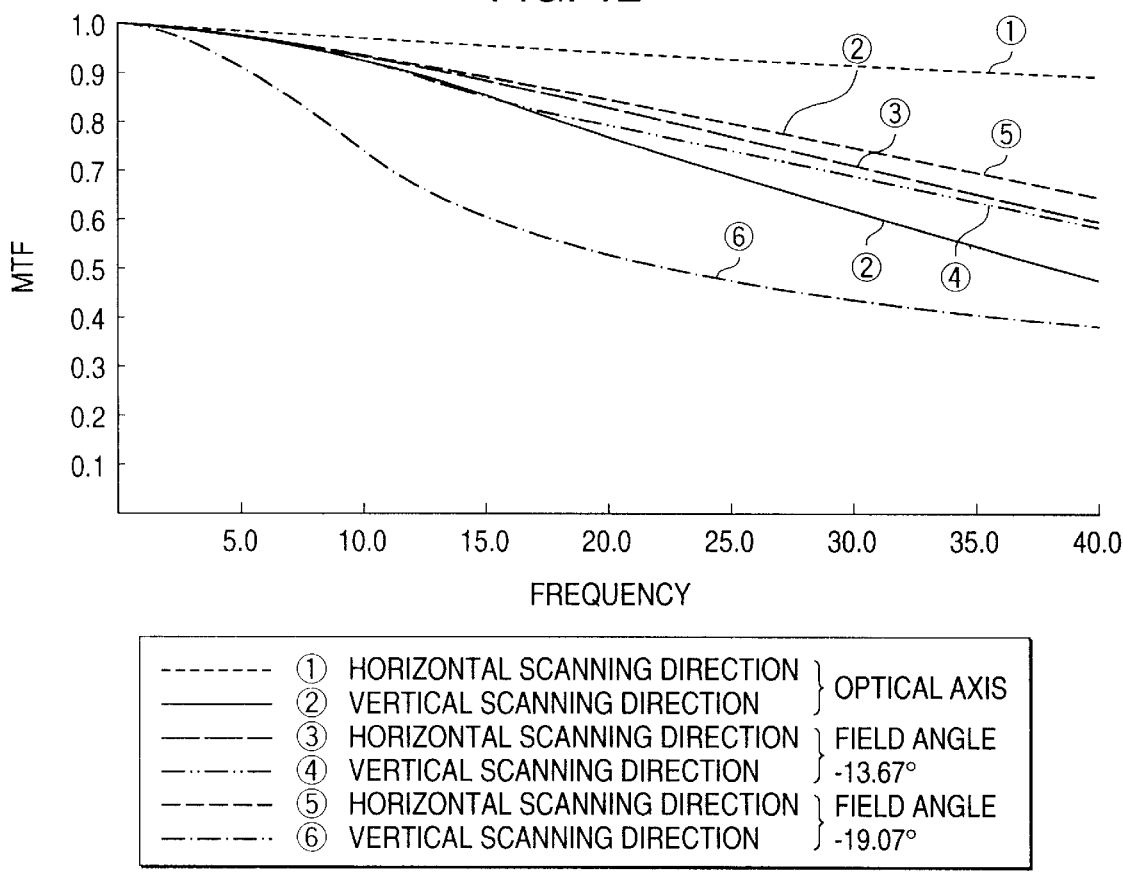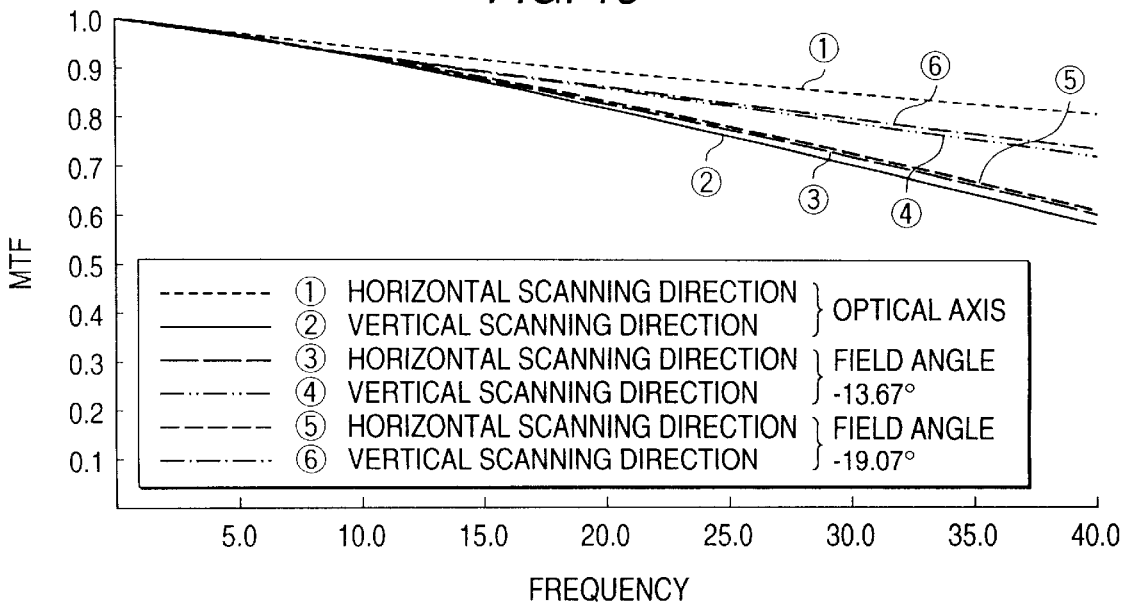

IMAGE READING APPARATUS

BACKGROUND OF THE INVENTION

1. Field of the Invention

The present invention relates to an image reading apparatus for optically reading an image on an original.

2. Description of the Related Art

In general, high speed, high resolution, high image quality, wide-width (A3 size) reading, and the like are required for a digital-type image reading apparatus, and a countermeasure against the lifting up of an original is required in the case of a copying machine or the like in light of the fact a booklet folded in two, a thick book, or the like is used as a original. If these requirements are considered in physical and optical terms, a high Nyquist frequency, a high modulation transfer function (MTF) characteristic, and high sensitivity, a wide field angle, and a deep focal depth of the sensor are required. As items which concern the specifications of an image-forming optical system after the determination of the sensor characteristics and conjugate length among the aforementioned items, it is possible to cite the height of the MTF and the focal depth.

Further, in the case of a color copying machine, a color scanner, and the like, the chromatic aberrations of the lens make an issue in addition to the aforementioned conditions. The chromatic aberrations include the longitudinal chromatic aberration which represents the difference in the position of the image point on the optical axis from one color to another as well as the chromatic aberration of magnification which represents the difference in the image size, and these chromatic aberrations respectively exert different influences on the evaluation of the image-forming optical system. Specifically, the longitudinal chromatic aberration offsets the peak of the MTF of each color in the image-forming optical system in the defocusing direction, and because it is necessary to establish a balance thereof, the longitudinal chromatic aberration deteriorates the MTF and results in the aggravation of the image quality. In contrast, since the chromatic aberration of magnification offsets the image-forming position for each color in the longitudinal direction of the charge coupled device (CCD) sensor, color offset occurs as a result.

As for the MTF characteristic, other than the chromatic aberrations the aberration of a single color also deteriorates it, so that its mechanism is very complicated. In addition, included among items of evaluation concerning the MTF are the height of the MTF at the CCD sensor surface, the allowable range (focal depth) in the case where the original is lifted up, and the color balance (DMTF) at each field angle. Among them, an increase in the DMTF and an increase in the chromatic aberration of magnification, although different in physical (optical) behavior, produce similar results in the light of an output from the CCD sensor. Namely, signal values to the outputted from the tricolor pixels at the same position in the longitudinal direction of the sensor change, with the result that a phenomenon occurs in which color information which combines them also changes from its original value. The fact that the color information changes means that the color reproducibility of an output image with respect to the original is deteriorated in a color copying machine. In the case of the color copying machine, there is a step in which the information which is read in blue (B), green (G), and red (R) is transformed into yellow (Y), magenta (M), cyan (C), and black (K) which are the original colors of the toner, but if the original data which has been read is offset by unspecified amounts, correction is difficult.

Further, coloring of edges in a region of the same color is among defects peculiar to the chromatic aberration of magnification. In the case of copying and outputting an image whose contour is often unclear as in the case of a photograph, slight color offset is often neglegible. However, in the case of an original which is composed by combining characters and graphic figures as in the case of a business document, if only edge portions of the characters and graphic figures in the horizontal scanning direction are set in a different color due to the chromatic aberration of magnification, that color becomes very noticeable, and leaves an unfavorable impression on looking at it. In contrast, ni the case of the MTF, although a difference in color appears overall, the situation does not occur in which only edge portions assume a different color. In this respect, the chromatic aberration of magnification rather than DMTF is difficult to cope with.

Furthermore, in the case of a digital color copying machine, image processing generally differs depending on whether the original is a text or an image such as a photograph. In the case where the original is a text, clear contrast between the text and the background facilitates reading. For this reason, in the case of the text original, image processing for enhancing edge portions of the text is effected. In the case of the image original, in contrast to the aforementioned text original, an unsharp change in color leaves a favorable impression on looking at it. Since the manner of image processing is thus changed depending on whether the original is a text or an image, most image processing units of copying machines have separate processing functions for text/image (T/I) built into them.

In addition, if the color which has been read is black or gray, a beautiful output can be obtained by expressing the color with a K toner instead of expressing it by superimposing Y, M, and C toners. For this reason, many color copying machine are provided with black-color determination processing functions in addition to the aforementioned separate processing functions for T/I. At that time, when a black color is separated from image information, if the output from the CCD sensor is offset from black due to the aforementioned aberration, a large problem occurs. If a T/I separation processing error and a black-color determination error occur at the same time, black character portions of the original are outputted in a colored and blurred state, with the result that a user is left an impression that the output is quite different from the original.

Particularly in recent years, full-color originals including high-resolution character information have begun to flood due to the development and widespread use of personal computers and presentation-material preparing tools, and the frequency at which such originals are copied has also increased. For this reason, defects ascribable to the aforementioned chromatic aberrations and DMTF have conceivably come to occur frequently.

In addition, in an image reading apparatus for reading a wide (A3-size) original at a high speed, to increase the sampling pitch of the reading sensor, i.e., the reading resolution, from 400 dpi to 600 dpi, it is necessary to reduce the pixel size of the sensor, so that the sensor sensitivity drops to a half or less. With respect to this problem, although increased sensitivity has been attained by improvement of the S/N ratio of the CCD sensors in recent years, in order to increase the reading resolution from 400 dpi to 600 dpi, as described above, and maintain a reading velocity equivalent to the case of 400 dpi, it is necessary to secure the brightness of F3.5 to F4.5 or thereabouts as the image forming lens assuming that electric power for illumination for illuminating the original with light is fixed.

Meanwhile, in order to read a large-size original, the field angle of the image forming lens must be increased. For example, if an A3-size original is to be read, a lens design is required which covers the reading range at a half field angle of 180 to 200. In addition to such a requirement, in the color image reading apparatus, the chromatic aberration of magnification for color image processing needs to be reduced. However, if an attempt is made to strictly incorporate such a requirement, other aberrations such as the curvature of field tend to become large, so that the lens design is made more difficult.

If under the condition of the ordinary cost the design is made to satisfy the aforementioned various conditions, i.e., to make the F-value of the lens small, enlarge the field angle, and reduce the chromatic aberration of magnification, the resolution in the radial direction of the lens declines. The decline in this resolution is noticeable in the case of the light which is remote from the optical axis of the lens, i.e., the reflected light from an end portion of the original. Since the resolution in the radial direction affects the reading performance in the vertical scanning direction of the reading sensor, the resolution of peripheral portions of the image will decline under the above-described conditions. Additionally, if the best image plane is curved, there occurs the problem that, coupled with the longitudinal chromatic aberration of the lens, offset (difference in MTF) in the modulation of the three colors of red (R), green (G), and blue (B) occurs. For instance, when a black character is read, the lines of the black character become colored, and the image processing unit is unable to recognize it as the black character, thereby deteriorating the character quality.

Therefore, as a measure for overcoming such a problem, a means is conventionally adopted in which the lens is made dark to correct the aberrations. However, if an attempt is made to correct the chromatic aberration of magnification by the lens design, the MTF characteristic tends to deteriorate due to the curvature of field. For this reason, even if anomalous dispersion glass, which is effective as a measure against chromatic aberrations, is used, the improvement of the characteristic of the lens proper is naturally limited. In addition, since the anomalous dispersion glass is three to five times higher in cost than ordinary glass materials, the use of the anomalous dispersion glass involves a substantial increase in cost.

In addition, to reduce the aberrations at the lens designing stage, a technique is generally adopted in which the aperture is reduced or the field angle is reduced. However, the field angle cannot be changed substantially since a constraining condition is imposed by the size of the original and the space of the copying machine. Therefore, a technique is often adopted in which the aperture is reduced (the lens is made dark) to reduce the aberrations. However, if the lens is made dark while maintaining a high speed and a high resolution, it is necessary to increase the amount of light from the lamp (light source) to secure a necessary amount of light in the light of the S/N ratio of the sensor, resulting in an increase in power consumption. Further, to realize the high speed, high resolution, and high quality as described above, the amount of exposure on the sensor surface cannot be allowed to decline. For this reason, to secure an necessary amount of exposure, it is necessary to increase the amount of light for illumination for illuminating the original with the light. However, since the increase in the quantity of illuminating light directly leads to an increase in power consumption, such a measure is not advantageous for reasons state below.

Namely, in the color image reading apparatus, a linear halogen lamps is frequently used because it excels in reproducibility of colors which have been read and because a large amount of light can be obtained. However, since this lamp is inferior in the efficiency for converting electric power to light, power consumption becomes inevitably large. In contrast, although working electric power per power-supply system which can be supplied from a power supply outlet in an ordinary office environment is 1.5 kVA, in the case of an electrophotographic copying machine, very large electric power is required by a heater portion for generating heat since heat is used for fixing the toner. In addition, even in the case of reading with 400 dpi in the current state, power consumption by the copying machine is a value which is narrowly lower than 1.5 kVA. For this reason, electric power which is consumed by the original reading unit needs to be reduced as practically as possible.

Further, in the case where an image is subjected to read scanning for each line by the line sensor, the effect of flicker when the halogen lamp is AC lit at a commercial frequency cannot be ignored. In particular, when high-gradation reading is effected in color, even in the case of a thermal light source such as a halogen lamp which produces a relatively small amount of flicker, the quality of the image which has been read is affected by the flicker. For this reason, in order to effect favorable reading, there arises the need to convert the power from AC to DC and DC light the halogen lamp. However, since a power loss occurs if this AC/DC conversion is effected, power which is consumed for illumination becomes increasingly large.

In addition, if an attempt is made to increase the reading resolution, since there is an increase in power consumption due to an increase in the video rate in the image processing unit, leeway in electric power which can be accommodated to an increase in the amount of illuminating light is equivalent to practically nil. For this reason, the securing the amount of exposure by increasing the amount of illuminating light in the above-described manner is not advisable if resultant disadvantages of the overall copying system (e.g., an increase in the standby time due to warming-up and a decline in the processing speed) are taken into account.

With respect to this problem, a technique has been conceived in which, by making use of inexpensive memories since the prices of memories have dropped in recent years, information which has been read is temporarily stored, and the reading speed is delayed in asynchronism with the copying output side (printer side), or the speed of reading in a single stroke is delayed by effecting full-color reading by single-stroke scanning. However, if this technique is used, the black-and-white copying time tends to be delayed in a color copying machine, so that it is necessary to strike a balance with the color copy. Nevertheless, strictly speaking, the ideal lies in increasing the reading speed irrespective of the black-and-while and color.

There is another reason for designing the lens to be as bright as possible. It is because, as a recent trend of a black-and-white copying machine, a xenon lamp with low power consumption has come to be used as the original illuminating lamp instead of the halogen lamp, and in the case of the full-color copying machine as well, a move to adopt the xenon lamp can be estimated from the standpoint of energy saving. Under the present circumstances, however, since the xenon lamp is inferior to the halogen lamp in the capability of outputting the amount of light, only data with a poor S/N ratio can be read by a dark lens.

Further, as a measure against chromatic aberration of magnification, a technique for electrically correcting the center of gravity with respect to an output of a CCD sensor is also known. However this measure leads to deterioration of the MTF as an electrical signal, and adversely affects the reproduction of characters. Consequently, even if the resolution is increased with much effort, there are apprehensions that that effort merely remains as a fact in the catalog specifications, and a situation can occur in which insofar as the result of output is actually observed, no improvement in the image quality can be recognized. Further, in a case there the image formation characteristic which cannot be covered by the lens is corrected by an electrical circuit or other optical element, such a case positively leads to higher cost if the cost incidental to it is considered.

Against such a backdrop, as a means for improving the resolution in the vertical scanning direction where problems occur, a sagittal stopper (light shielding plate) for condensing the lens aperture in the vertical scanning direction (in the sagittal direction of the lens) is in use.

Conventionally, however, after the image forming lens is designed with a good balance as much as possible so as to obtain a fixed level of resolution or higher over the entire region of the original in the horizontal scanning direction, and the sagittal stopper is used only as an auxiliary means if the required specifications cannot be still satisfied. Therefore, it cannot necessarily be said that the characteristics of the image-forming optical system as a whole have been set in the best state.

SUMMARY OF THE INVENTION

The present invention has been devised in view of the above-described aspects, and its object is to improve the resolution characteristic of the image-forming optical system as a whole while minimizing the loss in the amount of reflected light from the original, by making more effective use of a sagittal stopper.

The image reading apparatus in accordance with the present invention includes: illuminating means for illuminating an original with light; a lens forming an image of reflected light from the original, the lens having a resolution characteristic in which a resolution in a vertical scanning direction in an image-reading wavelength region at a field angle in a vicinity of an end of the original is lower than a minimum resolution in an image-reading wavelength region at a field angle on an inner side of the vicinity of the end of the original; light shielding means for shielding part of the reflected light such that a pupil diameter in the vertical scanning direction in the reflected light from the vicinity of the end of the original is reduced; and photoelectrically converting means for converting the reflected light partly shielded by the light shielding means and undergone image formation by the lens into an electrical signal.

In the image reading apparatus having the above-described arrangement, by adopting the lens having a resolution characteristic in which the resolution in the vertical scanning direction in the image-reading wavelength region at the field angle in the vicinity of the end of the original is lower than a minimum resolution in the image-reading wavelength region at the field angle on the inner side of the vicinity of the end of the original, the degree of freedom in the lens parameter design is enhanced. Accordingly, the longitudinal chromatic aberration and the chromatic aberration of magnification at the field angle on the inner side of the vicinity of the end of the original, as well as the curvature of field, astigmatism, distortion, and the like can be suppressed to levels lower than conventional levels. In addition, if the lens having the above-described resolution characteristic is adopted, the resolution in the vertical scanning direction in the vicinity of the end of the original declines. However, the declined portion of the resolution is raised up to a necessary resolution by shielding part of the reflected light by the light shielding means such that the entrance pupil in the vertical scanning direction becomes small when the reflected light from the vicinity of the end of the original is incident upon the lens. Consequently, a reduction in the aberrations of the image-forming optical system as a whole can be attained.

BRIEF DESCRIPTION OF THE DRAWINGS

Similar reference characters denote corresponding features consistently throughout the attached figures. The preferred embodiments of this invention will be described in detail, with reference to the following figures, wherein;

FIGS. 3A and 3B are diagrams illustrating the structure and function of a sagittal stopper;

FIGS. 6A and 6B are diagrams explaining the function of the sagittal stopper shown in FIG. 5;

FIG. 10 is a diagram of an MTF versus frequency characteristic for red (R) using the lens proper;

FIG. 11 is a diagram of the MTF versus frequency characteristic for green (G) using the lens proper;

FIG. 12 is a diagram of the MTF versus frequency characteristic for blue (B) using the lens proper;

FIG. 13 is a diagram-illustrating the MTF versus frequency characteristic for red (R) in a state in which the lens and the sagittal stopper are combined;

DETAILED DESCRIPTION OF THE PREFERRED EMBODIMENTS

Figure 1:
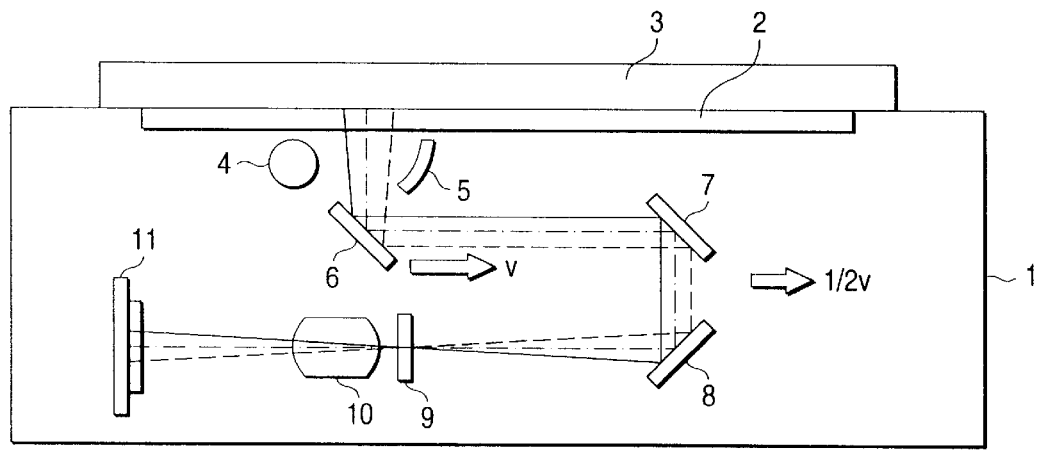
FIG. 1 is a schematic diagram illustrating the configuration of an image reading apparatus in accordance with the present invention.

Referring now to the drawings, a detailed description will be given of an embodiment of the present invention.

FIG. 1 is a schematic diagram illustrating the configuration of an image reading apparatus in accordance with the present invention.

In FIG. 1, reference numeral 1 denotes a cabinet which forms the structure of an enclosure. A platen glass 2 for placing an original thereon is attached to an upper opening of this cabinet 1. The original (not shown) is set on the platen glass 2 in a state in which an image to be read is facing down. A platen cover 3 is openably provided on top of the cabinet 1. The platen cover 3 is placed over the platen glass 2 when reading the image on the original, and serves to cause the original to be held in close contact with the platen glass 2.

In addition, provided inside the cabinet 1 are a lamp (illuminating means) 4 for applying light to the original set on the platen glass 2; a reflector 5 which serves to efficiently collect the light emitted from the lamp 4 onto the surface of the original; a first mirror 6 for laterally reflecting the reflected light from the original; a second mirror 7 for downwardly reflecting the reflected light from the first mirror 6; and a third mirror 8 for laterally reflecting the reflected light from the second mirror 7.

Among these components, the lamp 4, the reflector 5, and the first mirror 6 are mounted on an unillustrated full-rate carriage, and are adapted to move at a velocity v in the direction of the arrow in the drawing. Meanwhile, the second and third mirrors 7 and 8 are mounted on an unillustrated half-rate carriage, and are adapted to move at a velocity ½ Σ v in the direction of the arrow in the drawing.

Further provided inside the cabinet 1 are a sagittal stopper 9 serving as a light shielding means; a lens 10 for causing the reflected light from the original to form an image; and a line image sensor (photoelectrically converting means) 11 such as a CCD image sensor for converting into an electrical signal the light which has undergone image formation by means of the lens 10. Incidentally, a double-Gauss type lens is adopted as the image forming Lens 10.

When the image on the original is actually read, the light emitted from the lamp 4 and collected by the reflector 5 is applied to the original, and the resultant reflected light from the original is consecutively reflected by the first, second, and third mirrors 6, 7, and 8. Then, the reflected light from the third mirror 8 is made incident upon the lens 10 through the sagittal stopper 9, and after the light is transmitted through the lens 10, the light forms an image on the line image sensor 11. At this time, the line image sensor 11 effects photoelectric conversion in response to the intensity of the incident light, thereby obtaining an image signal (RGB) signal) corresponding to the image on the original.

Figure 2:
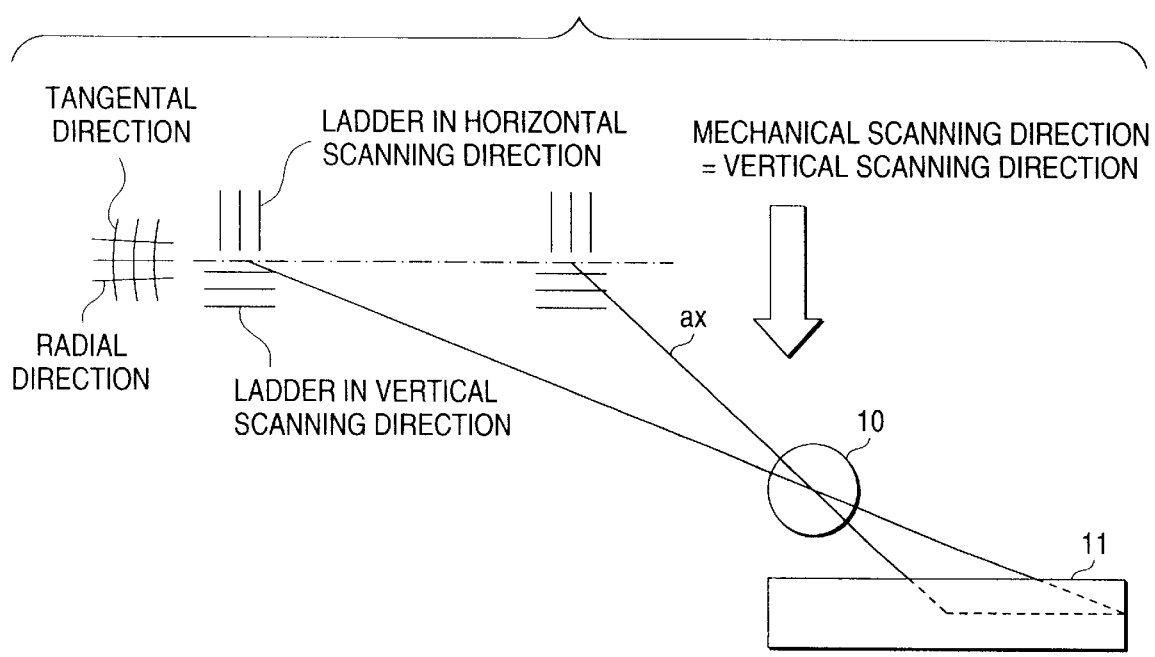
FIG. 2 is a diagram explaining the basic characteristic of the lens.

Next, referring to FIG. 2, a description will be given of basic characteristics of the lens 10 which is adopted in this embodiment.

First, when an image at a position spaced apart from an optical axis ax, i.e., in the vicinity of the original's end, is formed by the lens 10, the MTF (modulation transfer function) characteristic, which represents the resolution of the lens, differs between information on a line pair in the tangential direction to a concentric circle centered around the optical axis ax and information on a line pair in the radial direction to the concentric circle. If such a lens 10 is used in the image reading apparatus using the line image sensor 11, the resolution (MTF) in the tangential direction corresponds to the resolution in the horizontal scanning direction (in the longitudinal direction of the sensor) of the line image sensor 11, while the resolution in the radial direction corresponds to the resolution in the vertical scanning direction (in the transverse direction of the sensor) of the line image sensor 11. In the light of the characteristics of the image forming lens, the resolution in the radial direction tends to be lower than the resolution in the tangential direction. Accordingly, in the line image sensor 11, the resolution in the vertical scanning direction of the image at a position spaced apart from the optical axis ax often becomes low.

When the light emitted from an object point located off the optical axis is incident upon the lens 10, the rays of light which passed through a meridional plane of its entrance pupil do not deviate from the meridional plane even after their emergence from the lens 10 because of the axial symmetry of the lens 10. For this reason, the resolution in the vertical scanning direction does not decline with respect to the light rays passing through the meridional plane.

For this reason, if the light rays incident upon the lens 10 are gradually condensed in a sagittal direction perpendicular to the meridional plane at its front-stage portion, the geometric aberration is reduced correspondingly, and the state of image formation improves. In addition, as the spreading of the image-forming bundle of rays in the sagittal direction is restricted, the focal depth in the state of image formation in the radial direction also improves.

Accordingly, in this embodiment, the sagittal stopper 9 for condensing the bundle of rays in the sagittal direction of the lens which corresponds to the vertical scanning direction is provided as a means for partially shielding the reflected light so that the entrance pupil diameter in the vertical scanning direction becomes small when the reflected light from the vicinity of the original's end is incident upon the lens 10.

FIGS. 3A and 3B are diagrams explaining the structure and function of the sagittal stopper adopted in this embodiment.

The illustrated sagittal stopper 9 is a rectangular thin plate, and a similarly rectangular opening 9a is formed in its center. This sagittal stopper 9 is disposed such that the center of the opening 9a is aligned with the optical axis ax of the reflected light from the original, and that the long side and the short side of the opening 9a respectively correspond to the horizontal scanning direction and the vertical scanning direction. Namely, the long side of the opening 9a is made parallel with the meridional plane of the reflected light from the original with respect to the lens 10, and the short side is made parallel to the sagittal plane. The meridional plane is a plane which connects the optical axis and an object point off the axis in the optical system, while the sagittal plane is a plane perpendicular to the meridional plane.

The arrangement provided is such that the short side of the opening 9a of the sagittal stopper 9 is set to be smaller than the range of an incident bundle of rays E which is restricted by the entrance pupil of the lens 10 itself, with the result that the entrance pupil in the vertical scanning direction in the vicinity of the original's end is made smaller by the sagittal stopper 4. Namely, the rays of light which are directed from a certain object point $OP_1$ in a direction above or below the opening 9a are shut off by the sagittal stopper 9 and are not made incident upon the lens 10. As a result, the entrance pupil of the lens 10 is reduced by the sagittal stopper 9 only in the sagittal direction. Because the opening 9a is rectangular, the light-shielding effect derived from this sagittal stopper 9 works uniformly over its entire region in the longitudinal direction (horizontal scanning direction). In other words, the light from an object point $OP_2$ on the optical axis ax is partially shielded by the sagittal stopper 9, and only the light which passed through the opening 9a forms an image at an image point $IP_2$. Meanwhile, the light from the object point $OP_1$ spaced apart from the optical axis ax is also partially shielded by the sagittal stopper 9, and only the light which passed through the opening 9a forms an image at an image point $IP_1$. It should be noted that, in FIG. 3A, the shaded portions represent portions of the bundle of rays which are cut off by upper and lower portions of the sagittal stopper 9.

Thus, since the sagittal stopper 9 cuts off the light rays which are spaced apart from the meridional plane and which affect the resolution in the vertical scanning direction, the sagittal stopper 9 improves the resolution in the vertical scanning direction at an end portion in the horizontal scanning direction (in the vicinity of the original's end), and improves the image-forming performance of the lens. Moreover, since the amount of light which is cut off takes place only in one direction (in the sagittal direction), the loss of the amount of light for improving the image-forming performance of the lens can be reduced.

Incidentally, in this case, since the bundle of rays in the vertical scanning direction is uniformly condensed over the entire region in the horizontal scanning direction, the amount of light is also reduced at a fixed rate. At that time, to improve MTF at the field angle in the end position, it is when the amount of light in the vertical scanning direction is cut off by 25% or thereabouts that the sagittal stopper 9 demonstrates its maximum effect, and the aperture of the sagittal stopper 9 is set in correspondence therewith. At this time, in order to secure the brightness of F3.5 or thereabouts as the entire image-forming optical system without increasing electric power for illumination by taking into consideration a reduction in the amount of light of 25% or thereabouts, it is necessary to design the lens proper to be F3 or thereabouts in terms of the F-value.

This is due to the fact that the required amount of light is proportional to the square of the ratio of the F-value. If a lens with the brightness of F3 or thereabouts is adopted by assuming that the present electric power for illumination is 100 W, electric power becomes 100 W$_Y$(3/3.5)$^2$÷0.75@98 W, so that it is possible not to increase the electric power for illumination.

With respect to the improvement of the resolution (MTF) in the vertical scanning direction by such a sagittal stopper 9, it has been known that the greater the field angle in the horizontal scanning direction, the greater its effect. This is attributable to the fact that since the entrance pupil of a lens at a field angle in the vicinity of the original's end is generally located close to an edge of the lens, in particular, the bundle of rays spread in the sagittal direction makes the aberration in the vertical scanning direction increase. Meanwhile, in the design stage of the lens, an overall balance is conventionally established by enhancing the resolution at the field angle in the vicinity of each end of the original by sacrificing the resolution (MTF) at a field angle on the inner side from the vicinity of each end of the original.

In contrast, in the case of this embodiment, instead of controlling the resolution with a good balance singly by means of the lens in the conventional manner, in the stage of designing parameters for determining the lens characteristics, it is so designed that the resolution in the vertical scanning direction at a field angle at the end is set intentionally low. In designing the lens, since optical simulation software is commercially available from various manufacturers concerned, the weight at the field angle at the end in the radial direction, i.e., the resolution in the image-reading wavelength region at the field angle in the vicinity of each end of the original, is set intentionally low in an automatic designing program of that optical smulation software, thereby adopting the lens 10 having a resolution characteristic wherein the resolution in the vertical scanning direction in the image-reading wavelength region at the field angle in the vicinity of each end of the original is lower than a minimum resolution in the image-reading wavelength region at the field angle on the inner side of the vicinity of each end of the original.

More specifically, in the wavelength regions of blue, green, and red, which are visible light regions, the MTF characteristic with respect to -the spatial frequency (lines/mm) varies among the respective wavelength regions. Particularly in effecting satisfactory character recognition, whether the MTF of the spatial frequency in the neighborhood of 5 lines/mm is good or bad constitutes an important factor. In contrast, in this embodiment, the lens 10 is deliberately adopted which has a resolution characteristic wherein the MTF in the vertical scanning direction in the image-reading wavelength region in the spatial frequency in the neighborhood of 5 lines/mm at the field angle in the vicinity of each end of the original is lower than a minimum MTF in the image-reading wavelength region at the field angle on the inner side of the vicinity of each end of the original in a best image plane.

As a result, since the degree of freedom in the lens parameter design is enhanced, the longitudinal chromatic aberration and the chromatic aberration of magnification, as well as the curvature of field, astigmatism, distortion, and the like can be suppressed to levels lower than conventional levels.

However, if the optical system of the image reading apparatus is formed by using such a lens 10, the MTF in the vertical scanning direction naturally deteriorates in the vicinity of each end of the original in the horizontal scanning direction. However, if the resolution in the vertical scanning direction in the image-reading wavelength region at the field angle at each end of the original is set intentionally low after allowing beforehand for the increased portion of the resolution (MTF in the vertical scanning direction) due to the above-described sagittal stopper 9, it is possible to overcome the decline in the resolution due to the above-described parameter design. In other words, in the image reading apparatus in accordance with the present invention, instead of auxiliarly using the light-shielding plate (sagittal stopper) after designing the image forming lens with a good balance as much as possible in the conventional manner, the sagittal stopper 9 is placed as an essential element in forming the optical system of the image reading apparatus, and the characteristics of the Lens 10 are determined on the precondition that this sagittal stopper 9 is used, thereby optimizing the characteristics of the overall image-forming optical system.

As a result, as compared with the case where the MTF balance is established singly by the lens in the conventional manner, it is possible to improve the MTF characteristic at a field angle other than that at the end, i.e., at the field angle on the inner side of the vicinity of each end of the original by the amount in which the degree of freedom of the lens design is enhanced.

Figure 4A:
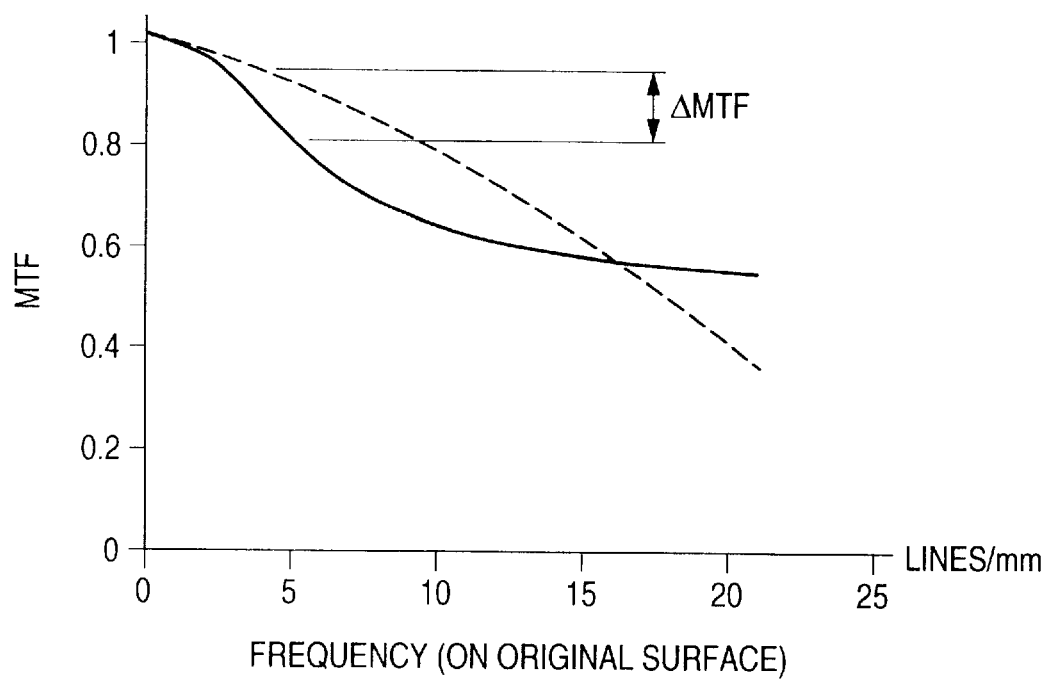
FIGS. 4A and 4B are diagrams illustrating the MTF frequency characteristic in cases where the sagittal stopper is absent and present.
Figure 4B:
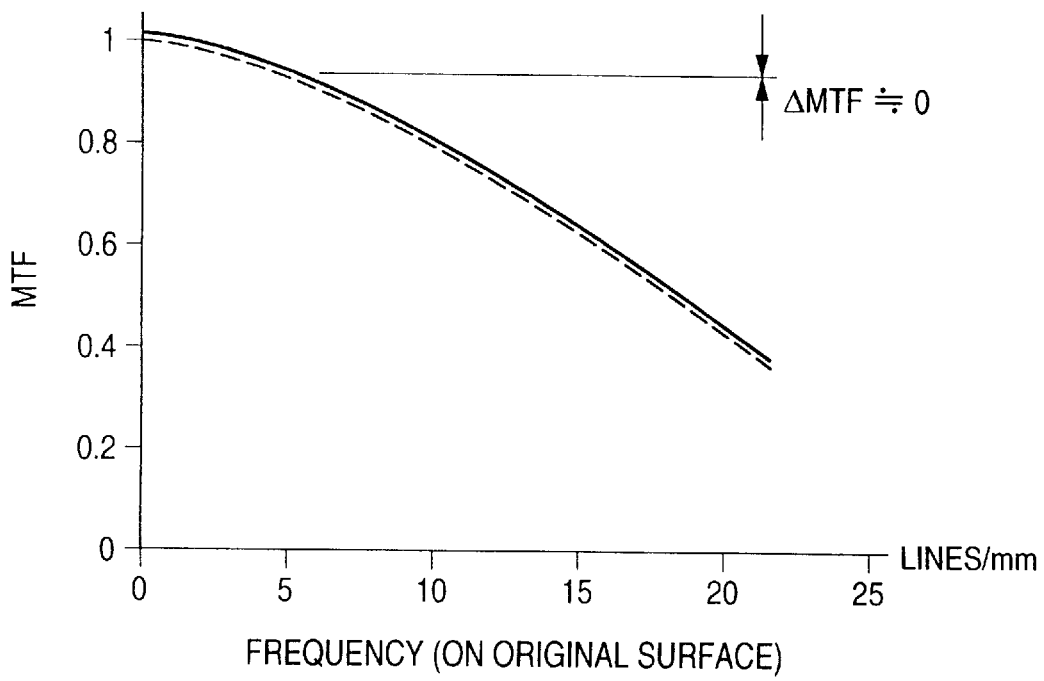

Here, an example of the MTF frequency characteristic in the vertical scanning direction in the visible light region is shown in the graphs of FIGS. 4A and 4B. It should be noted that the solid-line curve in the graphs denotes the MTF characteristic at the field angle at the end, and the broken curve denotes the MTF characteristic at a field angle on the inner side thereof. In this simulation conducted, characteristic curves such as those illustrated were shown with respect to the respective wavelength regions of blue, green, and red.

Namely, in the MTF frequency characteristic of the lens without the sagittal stopper, which is shown in FIG. 4A, a characteristic is shown in which the MTF at the field angle at the end in the spatial frequency of 5 to 15 lines/mm is generally lower than the MTF at the field angle on the inner side thereof. In contrast, in the MTF frequency characteristic of the lens with the sagittal stopper, which is shown in FIG. 4B, the MTF in the aforementioned spatial frequency of 5 to 15 lines/mm is raised due to the light-shielding effect of the sagittal stopper 9, and satisfactory MTF characteristics are obtained uniformly at both field angles.

In this case, the MTF characteristic at the field angle on the inner side of the vicinity of each end of the original is set to a level higher than the conventional level without being sacrificed at the lens design stage. Additionally, the MTF at the field angle in the vicinity of each end of the original is raised to a level commensurate with the MTF at the field angle on the inner side due to the light-shielding effect of the sagittal stopper 9.

Accordingly, as the characteristic of the overall image-forming optical system, aberrations are reduced as compared with the conventional case, and a most satisfactory state is attained.

In addition, in setting the characteristic of the lens 10, if the difference between the resolution in the vertical scanning direction at the field angle in the vicinity of each end of the original and the minimum resolution at the field angle on the inner side thereof is set to a level equivalent to the part of the resolution enhanced by the sagittal stopper 9, the difference with the MTF in a predetermined frequency without the sagittal stopper, which is shown in FIG. 4A, e.g., the difference in the MTF (ΔMTF) in the vicinity of 5 lines/mm which substantially affects the resolution when reading, for example, character information, becomes substantially 0 (zero) in the sagittal stopper-provided state shown in FIG. 4B. As a result, it becomes possible to satisfactorily read the character information recorded on the original, and variations in the MTF of the overall image-forming optical system can be reduced, so that it is possible to prevent a decline in the reading image quality attributable to it.

It should be noted that the image-reading wavelength regions are not limited to the visible light wavelength regions of blue, green, and red, and may include five wavelength regions by adding ultraviolet and infrared light which are wider than the same. As the characteristic of the lens 10 which satisfies the condition that the resolution in the vertical scanning direction of the image-reading wavelength region at the field angle in the vicinity of each end of the original is lower than the minimum resolution of the image-reading wavelength region at the field angle on the inner side of each end of the original, it suffices if the aforementioned condition is satisfied in at least any two or more wavelength regions among the wavelength regions of ultraviolet, red, green, blue and infrared light.

In the above-described embodiment, there arises the need to design the lens proper to be F3 or thereabouts since the sagittal stopper 9 having the rectangular opening 9a is adapted. However, to further alleviate the condition of the lens design, it suffices if a sagittal stopper 19 such as the one shown in FIG. 5 is adopted.

Figure 5:
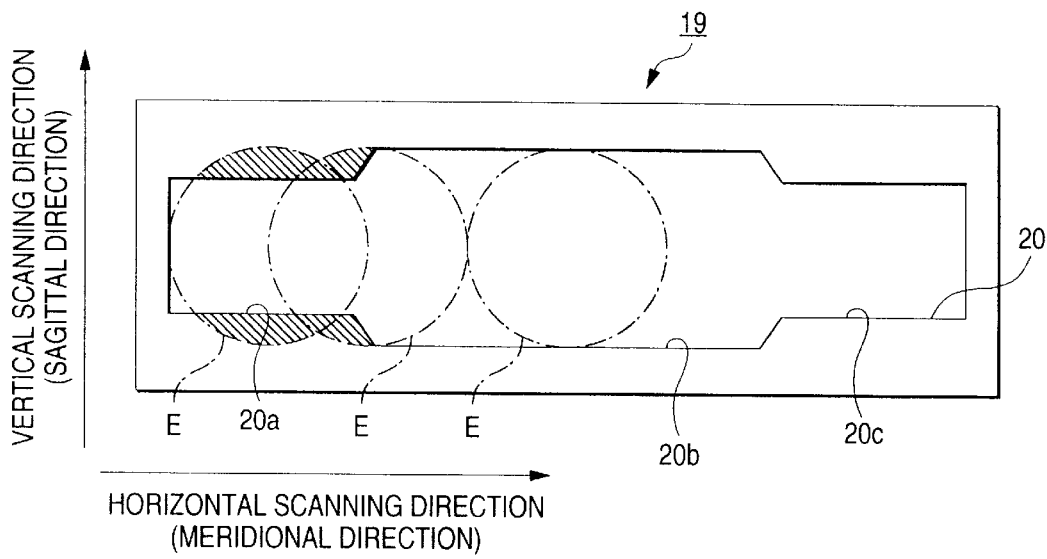
FIG. 5 is a diagram illustrating another example of the sagittal stopper.

The sagittal stopper 19 shown in FIG. 5 is a rectangular thin plate in the same way as described above, but the shape of an opening 20 formed in its center is substantially different. Namely, the opening 20 in this case is elongated along the longitudinal direction of the sagittal stopper 19, and its longitudinal opposite end portions are formed to be narrower than the central portion.

Narrow portions 20a and 20c at the opposite end portions of the opening 20 are set to be of the mutually same width (the width referred to here corresponds to the vertical length in the drawing), while a wide portion 20b at the center has a wider length than the aforementioned width. Of these widths, the width of the narrow portions 20a and 20c is set to be smaller than the diameter of the incident bundle of rays E which are limited by the entrance pupil of the lens 10, whereas the width of the wide portion 20b is set to be equal to the diameter of the incident bundle of rays E which are limited by the entrance pupil of the lens 10. However, the width of the wide portion 20b may be set to be larger than the diameter of the incident bundle of rays E. Further, the width of a portion between the wide portion 20b and the narrow portion 20a is made gradually narrower toward the narrow portion 20a, while the width of a portion between the wide portion 20b and the narrow portion 20c is made gradually narrower toward the narrow portion 20c.

If the sagittal stopper 19 of such a shape is used, since the width of the narrow portions 20a and 20c in the opening 20 is smaller than the diameter of the incident bundle of rays E which are limited by the entrance pupil of the lens 10, the reflected light from the vicinity of each end of the original is condensed in the sagittal direction by the sagittal stopper 19. Namely, as shown in FIG. 6A, the light which is directed in a direction above or below the opening 20 from the certain object point $OP_1$ spaced apart from the optical axis ax is shut off by the sagittal stopper 19 and is not made incident upon the lens 10. Hence, only the light which passed through the opening 20 forms an image at the image point $IP_1$.

Meanwhile, since the width of the wide portion 20b in the opening 20 is set to be equal-to the diameter of the incident bundle of rays E which are limited by the entrance pupil of the lens 10, the reflected light from the center of each end of the original is not condensed by the sagittal stopper 19. In other words, as shown in FIG. 6B, the entire light which is directed toward the sagittal stopper 19 from the object point $OP_2$ on the optical axis ax passes through the wide portion 20b and is made incident upon the lens 10, and forms an image at the image point $IP_2$ after passing through the lens 10. This also holds true of the light from an object point in the vicinity of the optical axis ax.

In this sagittal stopper 19, since only the reflected light from the vicinity of each end of the original is shielded in the sagittal direction, and the reflected light from the center of the original is not shielded at all, the reduction in the amount of light due to the sagittal stopper 19 can be suppressed to a necessary minimum in improving the resolution in the vertical scanning direction in the vicinity of each end of the original. Specifically, if it is assumed that a 10% portion of the amount of light is cut off by 25% from each opposite end (the field angle at each extreme end) of the opening 19a in the same way as described above, the total reduction in the amount of light can be 5%.

In this case, however, since the amount of light in the vertical scanning direction is not cut off uniformly in the overall region in the horizontal scanning direction, correction of the amount of light to cope with it becomes necessary separately.

Accordingly, to correct such nonuniformity in the amount of light in the horizontal scanning direction, it suffices if the following means is adopted. For example, in the case where a linear halogen lamp is adopted as the illuminating means, the density of the arrangement of a filament built in it is changed. That is, the density of the arrangement of the filament at each opposite end portion of the lamp is set to be higher than that at the central portion of the lamp. As a result, since it is possible to increase the amount of light for illumination at each end of the original, it is possible to offset the reduction in the amount of light at the field angle at each end by the sagittal stopper 19, thereby making it possible to make the amount of light uniform over the entire region in the horizontal scanning direction.

Further, if the above-described sagittal stopper 19 is adopted, since the sagittal stopper 19 does not condense the entrance pupil diameter in the vicinity of the center of the lens 10, it becomes unnecessary to take into account the portion of the reduction in the amount of light due to the sagittal stopper 19. Accordingly, since the lens proper can be designed to be F3.5, it becomes possible to form the image-forming optical system with an even higher lens characteristic (MTF characteristic) than in the above-described embodiment.

It should be noted that although the above-described 5% reduction in the amount of light is compensated for somewhere, but if a system such as a digital copying machine or the like is considered, it is considered that such a slight degree of an increase in electric power is included in the allowable range of the overall system, and does not present a particular problem.

In addition, even if the increase in electric power entailed by the 5% reduction in the amount of light constitutes a problem, since various means for improving the power factor of a power source of the lamp are available, a desired means may be selected in correspondence with a target value and cost. Incidentally, if 5% or thereabouts of electric power (VA) is to be reduced, it is possible to provide a sufficient measure by merely inserting a choke coil in a stage preceding the power source of the lamp.

By way of reference, if an improvement is made on the power factor of the power source of the lamp by using a standard-item choke coil, a limit of the electric power (VA) which can be thereby reduced is 25% to 30% or thereabouts at maximum. For this reason, in the case where the brightness of the lens 10 is designed with F3.5 by using the sagittal stopper 9 shown in FIG. 3A, the improvement of the power factor by the use of the choke coil reaches a limit level of the reduction of electric power. However, if the sagittal stopper 19 shown in FIG. 5 is adopted, the reduction of electric power can be only 5% or thereabouts, so that the reduction of electric power can be compensated for with leeway.

Figure 7:
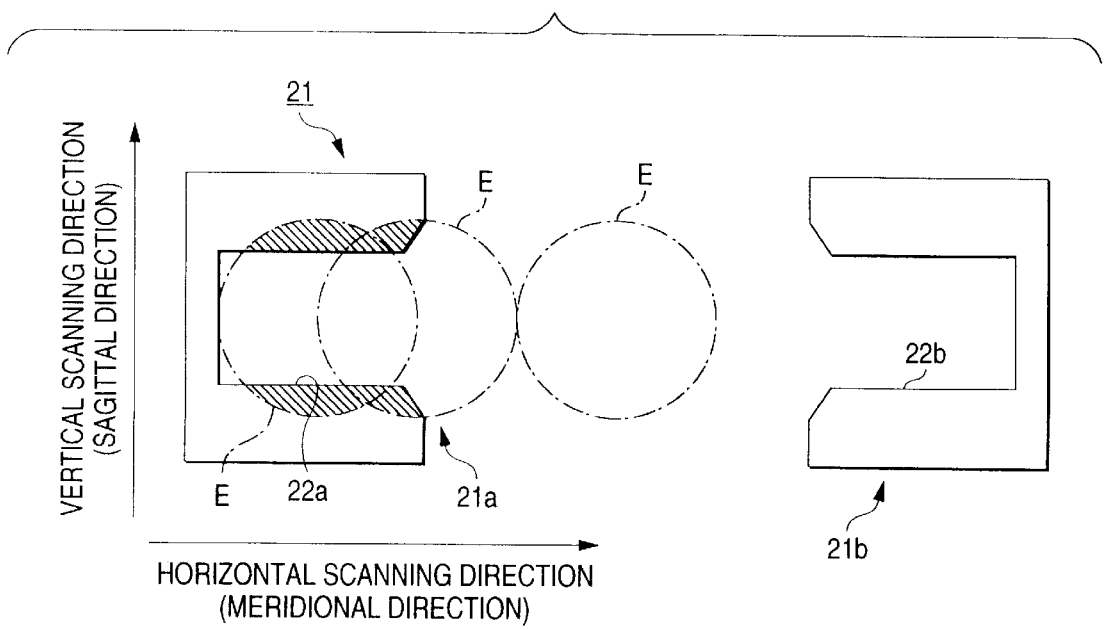
FIG. 7 is a diagram illustrating a modification of the sagittal stopper shown in FIG. 5.

It should be noted that since the sagittal stopper 19 shown in FIG. 5 is so arranged that the reflected light from the center of the original is not shielded at all by the wide portion 20b of the opening 20, an arrangement may be provided such that, as shown in FIG. 7, a sagittal stopper 21 is split into two in the horizontal scanning direction, and these two stopper segments 21a and 21b are arranged in face-to-face relation in the same plane, and the reflected light from the vicinity of each end of the original is shielded by notched portions 22a and 22b of the stopper segments 21a and 21b. In such an arrangement as well, it is possible to obtain a similar operational effect to that of the sagittal stopper 19.

In addition, with respect to the nonuniformity of the amount of light in the case where the sagittal stopper 19 (or 21) is used, if a waveguide (not shown), for example, is adopted in the illuminating means, the nonuniformity can be corrected easily if the width of a slit for allowing the light guided to the interior of the waveguide to leak to the outside is appropriately adjusted between each opposite end and a central portion of the waveguide.

In conventional techniques, lenses with various characteristics for use in copying machines, scanners, and the like have been presented. In addition, as a lens characterized by having a high image-forming characteristic, in particular, a Gauss-type reading lens having a four-group, six-element arrangement and an F-value of 4.5 is disclosed in Japanese Patent Application Laid-Open No. 113802/1997, for example. However, the reading lens disclosed in this publication has a drawback in that it is very difficult to handle in terms of water resistance, blue tarnish resistance, resistance to damage, and the like, and that the cost of the lens proper is high.

In contrast, if an attempt is made to secure the brightness of F4.5 or thereabouts, for example, as a lens for simultaneously improving the chromatic aberration of magnification and the MTF characteristic by making effective use of the sagittal stopper described in the above-described embodiment, it is necessary to reduce the F-value (brighten) of the lens proper by enlarging the lens diameter so as to compensate for the shielded portion due to the sagittal stopper. In that case, there are apprehensions that the size becomes large and the cost increases due to the enlargement of the lens diameter. Nevertheless, if the lens arrangement is considered through a combination with the sagittal stopper, there are cases where it is possible to avoid the aforementioned difficulty in the handling of the lens as well as the increased size and cost due to the enlargement of the lens diameter, after securing the brightness of the optical system at the level of F4.5.

Hereafter, a description will be given by citing specific examples.

Figure 8:
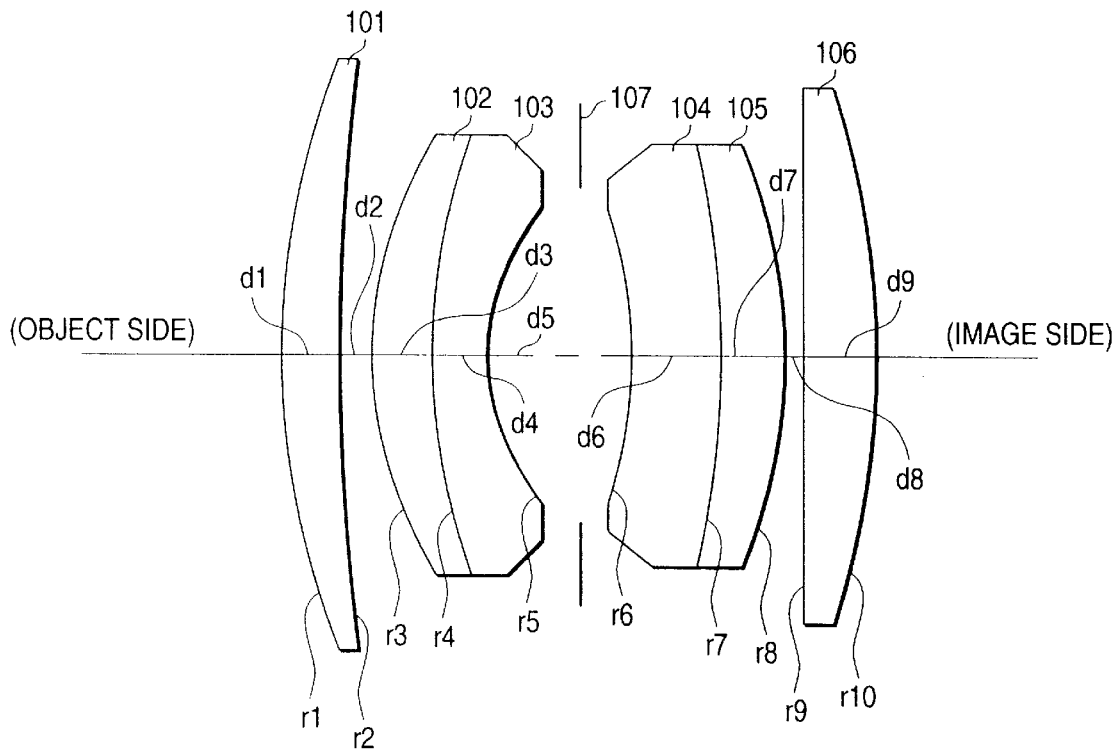
FIG. 8 is a diagram illustrating the overall configuration of the lens.

First, FIG. 8 shows an overall configuration of the lens in accordance with this embodiment.

As shown, in the overall lens, first, second, third, and fourth lens groups are arranged in order from the object side toward the image side (from the left-hand side toward the right-hand side in FIG. 8).

A first lens 101 which forms the first group is a positive meniscus lens whose convex surface faces the object side (toward the left-hand side in the drawing).

The second lens group is formed by a cemented lens in which a second lens 102 and a third lens 103 are cemented together. Of these lenses, the second lens 102 is a positive meniscus lens whose convex surface faces the object side, while the third lens 103 is a negative meniscus lens whose convex surface faces the object side.

The third lens group is formed by a cemented lens in which a fourth lens 104 and a fifth lens 105 are cemented together. Of these lenses, the fourth lens 104 is a negative meniscus lens whose concave surface faces the object side, while the fifth lens 105 is a positive meniscus lens whose concave surface faces the object side.

A sixth lens 106 which forms the fourth group is a positive meniscus lens whose concave surface faces the object side.

Further, a diaphragm 107 is interposed between the third lens 103 (second group) and the fourth lens 104 (third group). With this diaphragm 107 placed in between, the first and second groups constitute a former-stage lens group, and the third and fourth groups constitute a latter-stage lens group.

As a result, the lens as a whole is formed as a Gauss-type lens having a four-group, six-element arrangement. Here, a description will be given of specific characteristic values of the lens (Gauss-type lens having a four-group, six-element arrangement) adopted in this embodiment.

First, assuming that ri is the radius of curvature of an i-th surface, di is an interval between the i-th surface and an (i+1)th surface, ni is a refractive index at a d-line of an i-th lens, and vi is an Abbe number at the d-line of the i-th lens, a lens which satisfies the numerical conditions shown in Table 1 below is adopted. Here, the d-line used in the specification is a spectral line of 587.56 mm applying helium (He) as a light source, which is generally used for measurement of the refractive index.

In addition, as the sagittal stopper which is combined with this lens, a rectangular sagittal stopper having, for example, a 12.2 mm opening in the vertical scanning direction is adopted on the first surface. This sagittal stopper may be disposed at any position between the original and the line sensor, in particular, between any lenses in the optical path and the line sensor, but the opening width of the sagittal stopper needs to be recalculated appropriately on the basis of the ratio of light shielding with respect to the lens pupil.

TABLE 1

| r1 | 31.55 | d1 | 5.77 | n1 | 1.639 | v1 | 55.5 |
|---|---|---|---|---|---|---|---|
| r2 | 79.76 | d2 | 0.10 | | | | |
| r3 | 24.32 | d3 | 7.19 | n2 | 1.639 | v2 | 55.5 |
| r4 | 51.57 | d4 | 0.95 | n3 | 1.648 | v3 | 33.8 |
| r5 | 16.55 | d5 | 22.36 | | | | |
| r6 | −16.10 | d6 | 0.95 | n4 | 1.603 | v4 | 38.0 |
| r7 | −104.8 | d7 | 6.65 | n5 | 1.639 | v5 | 55.5 |
| r8 | −22.70 | d8 | 0.16 | | | | |
| r9 | −165.0 | d9 | 5.47 | n6 | 1.639 | v6 | 55.5 |
| r10 | −37.25 | | | | | | |

Incidentally, the shape of the sagittal stopper adopted here and the state of light shielding with respect to the lens pupil are shown in FIG. 3B. Here, by assuming that the distribution of the amount of light in the pupil is uniform, the extent to which the amount of light is reduced is determined from a ratio between the area where the light is shielded by the sagittal stopper and the overall area of the pupil, and on the basis of the determined result the brightness of the overall optical system is secured to an equivalent of F4.5. For example, if the F-value of the lens is set to be 4.0, the opening width is set such that the amount of light reduced by shielding by the sagittal stopper becomes an equivalent to F0.5, thereby setting the brightness of the overall optical system to an equivalent of F4.5.

Next, a description will be given of the lens diameter with reference to FIG. 9.

Figure 9:
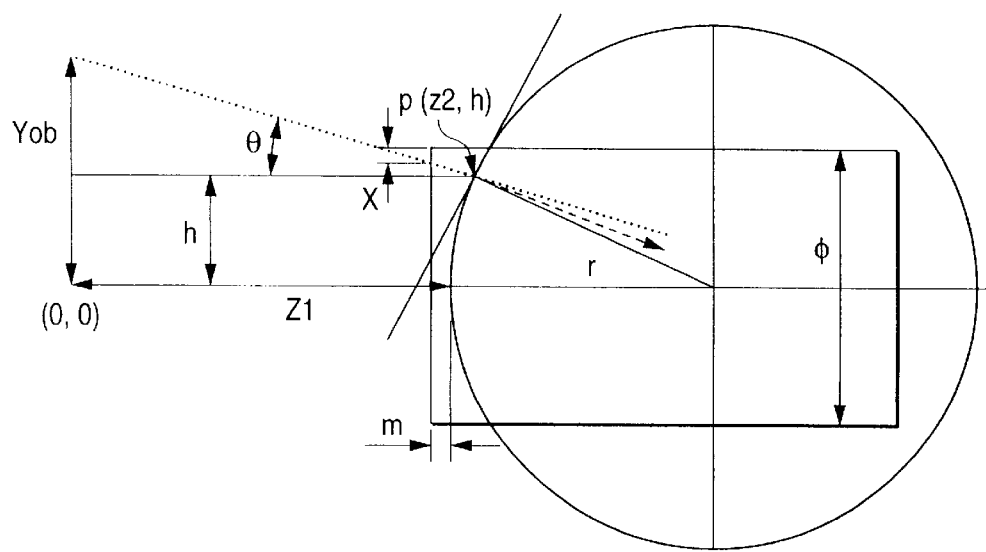
FIG. 9 is a diagram explaining parameters for making the lens diameter small.

In FIG. 9, if it is assumed that a point of intersection between the optical axis and an object surface is an origin (0, 0), that the height of the object is Yob, that the radius of curvature of the first surface of the lens is r, that the distance between he object and the first surface of the lens is Z1, that the coordinate of the point of intersection with the first surface of the lens at the maximum height of light rays incident upon the lens from the object is p(z2, h), that the thickness of the lens barrel is x, that the length of the lens barrel projecting toward the object side from the first surface of the lens is m, and that the lens diameter is $\phi$, then z2, tan θ, and x are expressed by $$z2 = r - \sqrt{(r^2 - h^2)} + Z1 \; \tan\theta = (Yob-h)/z2 \; x = \phi/2 - h - (z2-Z1+m) \tan\theta$$

so that we have $$\phi/2 = x + h + (z2-Z1+m) \tan\theta = x + Yob - (Z1-m)(Yob-h)/z2$$

Here, Yob is sufficiently large with respect to x, and Z1 is also sufficiently large with respect to m, if it is assumed that x=m=0, and Z1/z2=k, $$\phi/2 = Yob \; (1-k) + k \cdot h$$

so that $\phi/2$ is calculated as a simple ratio.

From this fact, in order to reduce $\phi$, it suffices if k →1 and →0, i.e., if the radius of curvature of the first surface of the lens is made large, and the lens length is made short.

If this aspect is taken into account, the effect of the present invention can be enhanced further by making the lens diameter small by using a Gauss-type lens comprising four or more groups, in which the focal length of the former group is long, i.e., the curvature of the first surface can be easily made gentle. As a lens having the best balance between the characteristic and the cost in combination with the sagittal stopper, it is possible to cite the Gauss-type lens having a four-group, six-element arrangement.

In the Gauss-type lens having a four-group, six-element arrangement, concave surfaces each having a small radius of curvature are generally present on both sides with a diaphragm placed therebetween, thereby correcting (making small) the Petzval sum. For this reason, it has hitherto been regarded that correction of aberrations in the sagittal direction is difficult, and it has been said that correction of aberrations is facilitated by using a glass material having a high refractive index. In reality, in the automatic lens design, if the range of the refractive index of the optical glass serving as the lens material is allowed up to a high range, and is used as a variable, the refractive indices of the first, fifth, and sixth lenses, in particular, tend to change toward higher levels.

However, this tendency is attributable to an algorithm of the automatic lens design in which the so-called error function is lowered by simultaneously overcoming the aberrations in the horizontal scanning direction (meridional direction) and the vertical scanning direction (sagittal direction) as the lens proper. This is a design technique which is suitable to a camera lens which needs to read area images simultaneously. In contrast, improvement in the performance of the image-forming optical system is not necessarily realized even if the above-described design means is applied to the arrangement in which RGB information is separately read one-dimensionally by the line sensor as in the color-image reading apparatus.

Namely, in the color-image reading apparatus using the line sensor, rather than the lowness of the error function when white light is made to form an image, or the highness of the MTF, the uniformity of the MTF and the chromatic aberration of magnification when light of RGB of the same intensity is made to form an image separately, and uniformity with respect to each field angle become important in the light of the necessity to synthesize color information in a later process. In addition, if the MTF is too high in-the Nyquist frequency, it can also constitute a factor of moiré.

Accordingly, in this embodiment, by introducing the sagittal stopper, the burden on correction of sagittal flare in the lens proper is alleviated. In the design of the Gauss-type lens, this sagittal stopper becomes an optimum means which is capable of correcting its disadvantages and bringing out its advantages to a maximum.

Further, since a higher refractive index of the glass material results in larger dispersion, if the color correction of the image forming system is taken into consideration, it can be said that the use of pieces of optical glass whose refractive indices at the d-line are from 1.60 to 1.68 and whose Abbe numbers are 47 or higher as the first, second, fifth, and sixth lenses, respectively, is suitable in terms of the balance between color correction and the MTF characteristic and in terms of cost in the image-forming optical system in accordance with this embodiment.

Here, FIGS. 10 to 12 show results of simulation of the MTF with respect to the frequency characteristic for red (R), green (G), and blue (B) using the lens proper (without the sagittal stopper) having the numerical configuration shown in Table 1 above. It should be noted that FIG. 10 shows the MTF versus frequency characteristic for R; FIG. 11 shows the MTF versus frequency characteristic for G, and FIG. 12 shows the MTF versus frequency characteristic for B. In addition, in each characteristic diagram, line ① shows a characteristic curve in the horizontal scanning direction on the optical axis; line ② shows a characteristic curve in the vertical scanning direction thereon; line ③ shows a characteristic curve in the horizontal scanning direction at a field angle of –13.67°; line ④ shows a characteristic curve in the vertical scanning direction at the same field angle; line ⑤ shows a characteristic curve in the horizontal scanning direction at a field angle of –19.07°; and line ⑥ shows a characteristic curve in the vertical scanning direction at the same field angle.

In FIGS. 10 to 12, it can be seen that the MTF in the vertical scanning direction at the field angle (–19.07°) in the vicinity of the end of the original is low particularly in the MTF versus frequency characteristic for R and B. By deliberately suppressing the characteristic in this portion to a low level, the degree of freedom of parameters in the lens design is enhanced, and emphasis is placed on the improvement of the characteristics of the MTF in the horizontal scanning direction and the chromatic aberration of magnification.

Here, the CCD sensor in this embodiment uses pixels each having a longitudinal side length of 0.933 mm.

Figure 14:
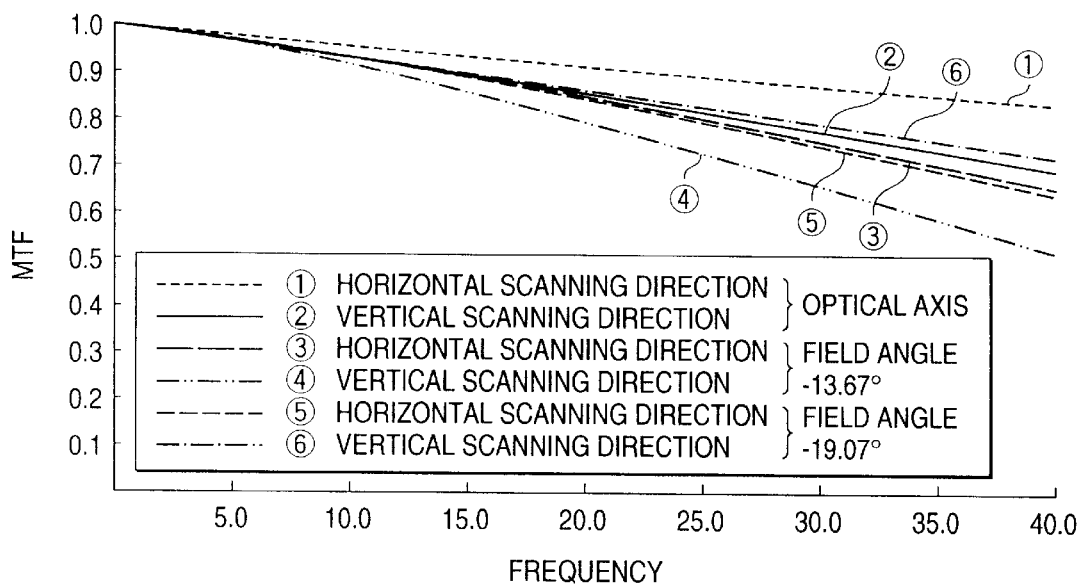
FIG. 14 is a diagram illustrating the MTF versus frequency characteristic for green (G) in the state in which the lens and the sagittal stopper are combined.
Figure 15:
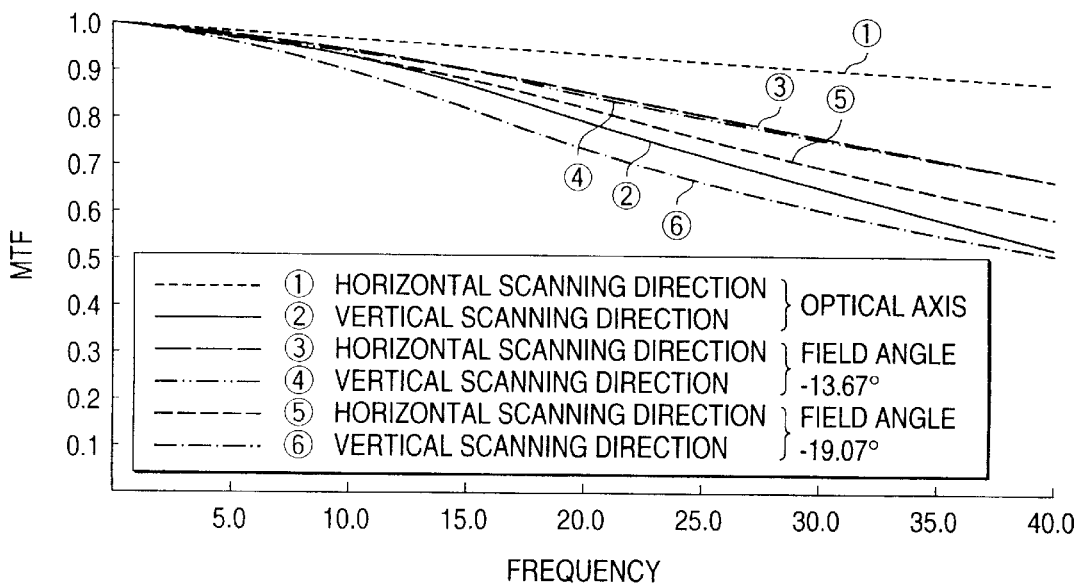
FIG. 15 is a diagram illustrating the MTF versus frequency characteristic for blue (B) in the state in which the lens and the sagittal stopper are combined.

Next, FIGS. 13 to 15 show results of simulation of the MTF versus frequency characteristic in a state in which the lens having the numerical configuration shown in Table 1 above and the sagittal stopper are combined (with the sagittal stopper). As is apparent from the drawings, the lowness of the MTF in the vertical scanning direction in the lens proper, which is noted in FIGS. 10 to 12 referred to earlier, is completely corrected by the effect of improvement of the resolution due to the sagittal stopper.

Figure 16:
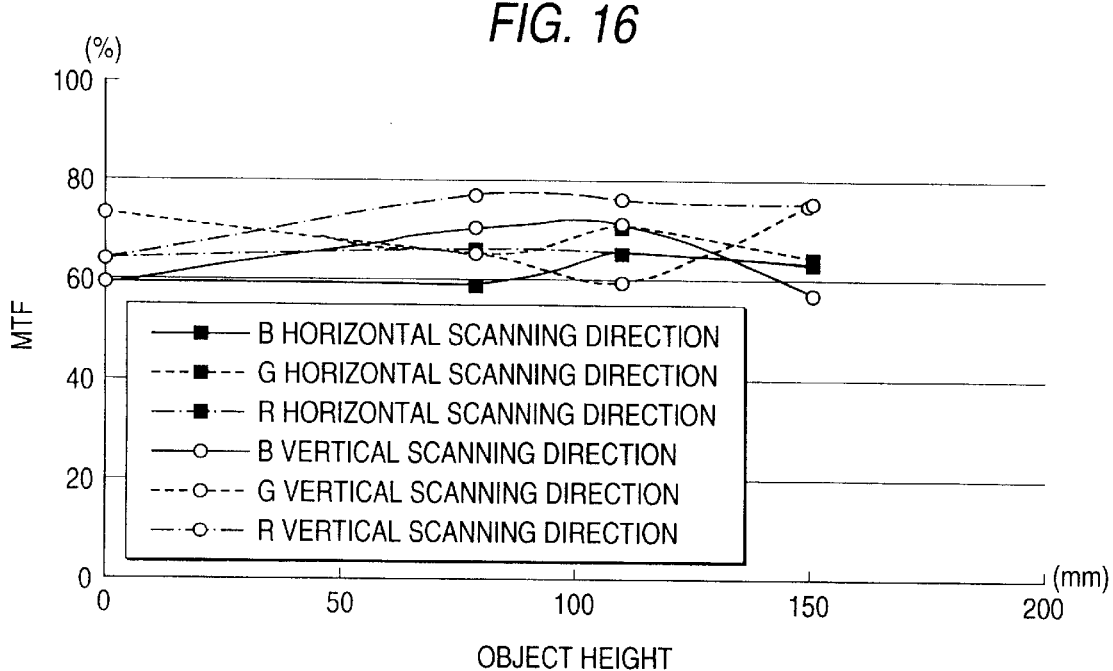
FIG. 16 is a diagram illustrating the MTF characteristic with respect to the field angle at a frequency of 7.87 line pairs/mm on the original surface.

Next, FIG. 16 shows the MTF characteristic with respect to the field angle at the spatial frequency of 7.87 line pairs/mm on the original surface. Incidentally, in FIG. 16, the object height constituting a factor determining the field angle is taken as the abscissa, and the MTF is taken as the ordinate.

As shown in the drawing, with respect to the three colors of B, G, and R, the respective MTF's are very uniformalized in spite of the change in the object height (relative magnitude of the field angle). In this case, the difference between a maximum resolution and a minimum resolution in the vertical scanning direction of the reflected light, i.e., ΔMTF, is kept within 20%. As a result, variations in the reading resolution can be reduced, and high image quality can be attained. If ΔMTF can be kept within 25%, sufficiently high image quality can be attained.

Figure 17:
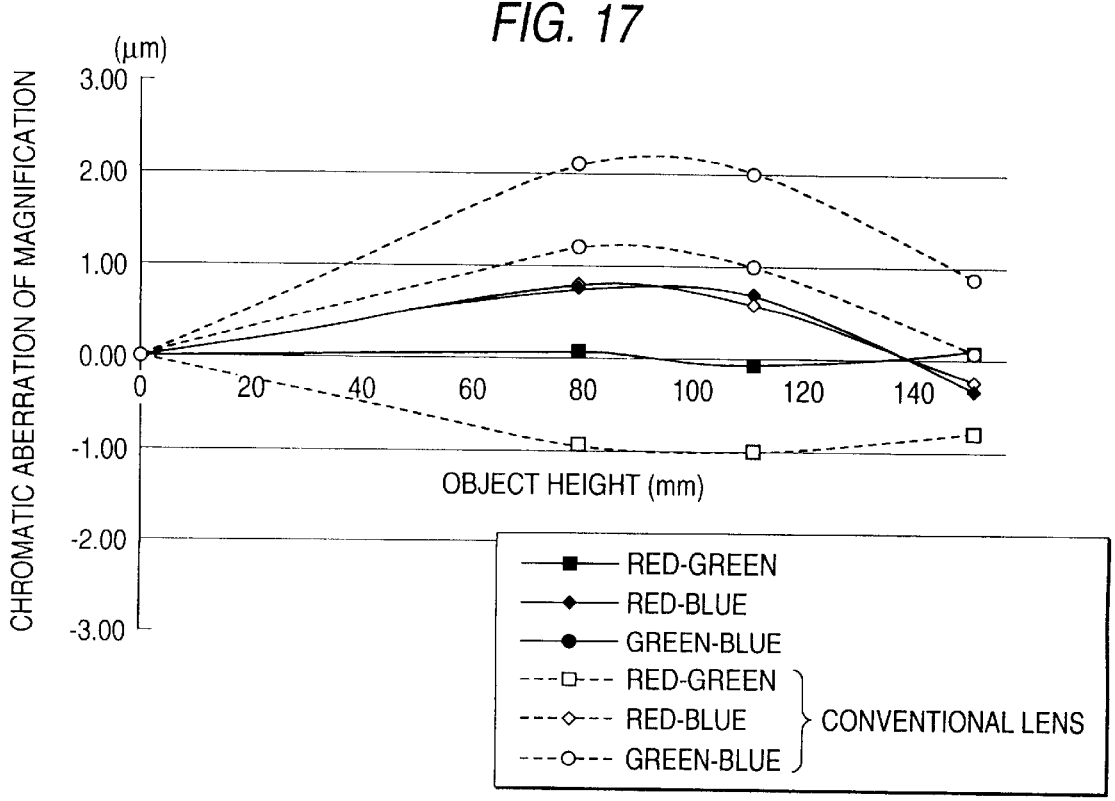
FIG. 17 is a diagram illustrating the characteristic of the chromatic aberration of magnification with respect to the field angle.

Furthermore, the characteristic of the chromatic aberration of magnification with respect to the field angle is shown in FIG. 17. In FIG. 17, the characteristic of the lens in accordance with this embodiment versus the field angle is indicated by the solid lines, and the characteristic of the conventional lens versus the field angle is indicated by the broken line.

It is apparent from the drawing that although in the conventional lens the chromatic aberration of magnification exceeds 0.933 mm, in the lens in accordance with this embodiment the chromatic aberration of magnification is kept below 0.933 mm. In other words, this indicates that the lens is so designed that the deviation between the center of gravity of image formation at the wavelength of a G color and the center of gravity of image formation at wavelengths of other colors which have been read is kept within 10% of the pixel. This makes it possible to reduce the error occurring when a determination of achromatic color is made from the image data which has been read by the CCD sensor.

Through the above-described arrangement, an image-forming optical system in which the chromatic aberration of magnification is kept within 1 mm and the difference in the MTF (ΔMTF) is small is realized by the combination of the lens having the characteristics in accordance with this embodiment and the sagittal stopper. As a result, in image processing using a CCD sensor output, the threshold level for black-color determination (c* in the CIE L*a*b* color space) can be set to a value of ⅔ or less than the conventional level, the range of color reproducibility can be expanded, and the rate of occurrence of erroneous determination of the black character can be reduced. Further, in the case there an energy saving-type xenon lamp is used in the reading optical system of a color copying machine, by using memory it becomes -possible to maintain a process speed equivalent to the case where a halogen lamp is used.

In addition, in the above-described lens configuration, by using pieces of optical glass whose refractive indices at the d-line are from 1.60 to 1.68 and whose Abbe numbers are 47 or higher as the first, second, fifth, and sixth lenses, respectively, it becomes very advantageous in terms of both cost and handling.

Furthermore, since the radii of curvature (r1, r6) of the first and sixth lenses are set to be ±30 mm or more to make their curvatures gentle, and the deteriorated portion of the aberration caused thereby is overcome by the sagittal stopper so as to enhance the image forming performance of the overall optical system, it is possible to simultaneously realize improvement of the characteristics and the reduction of the lens diameter. Accordingly, since the reduced portion of the lens diameter is offset by the enlarged portion of the lens diameter when the F-value of the lens proper is made small (F4.5→F4.0), it is possible to substantially avoid an increase in the size.

In addition, by using optical glass of the same material (glass material) for the first, second, fifth, and sixth lenses, it is possible to expect a reduction in cost through common use of the glass material.

Further, in making the lens more compact, it suffices if a Gauss-type lens having a four-group, six-element arrangement is used, which satisfies the numerical configuration shown in Table 2 below.

TABLE 2

| r1  | 31.80   | d1 | 5.1   | n1 | 1.658 | v1 | 50.9 |
|-----|---------|----|-------|----|-------|----|------|
| r2  | 78.41   | d2 | 0.11  |    |       |    |      |
| r3  | 23.70   | d3 | 7.26  | n2 | 1.639 | v2 | 55.5 |
| r4  | 61.77   | d4 | 0.90  | n3 | 1.648 | v3 | 33.8 |
| r5  | 16.38   | d5 | 22.77 |    |       |    |      |
| r6  | –16.59  | d6 | 0.90  | n4 | 1.603 | v4 | 38.0 |
| r7  | –538.0  | d7 | 6.98  | n5 | 1.639 | v5 | 55.5 |
| r8  | –23.80  | d8 | 0.11  |    |       |    |      |
| r9  | –160.5  | d9 | 4.87  | n6 | 1.670 | v6 | 47.3 |
| r10 | –39.00  |    |       |    |       |    |      |

In the lens configuration shown in Table 2, as compared with the lens configuration shown in Table 1 referred to earlier, the refractive indices (with respect to the d-line) of the first and sixth lenses are made higher (1.65 or more), and the curvatures of the first and final surfaces are made gentler by that portion. Further, after the F-value of the overall optical system is secured to an equivalent to 4.5, the F-value of the lens proper is made darker, and the decline in the amount of light by that portion is compensated for by expanding the opening width of the sagittal stopper by 0.6 mm (12.2 mm Æ 12.8 mm), thereby attaining a compact lens.

Figure 18:
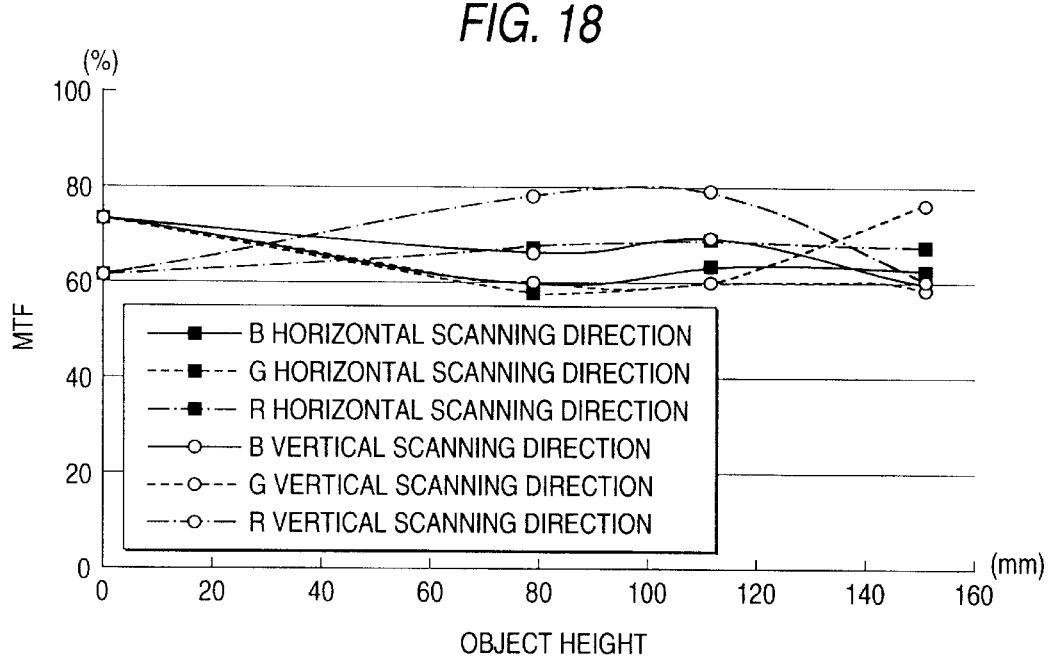
FIG. 18 is a diagram illustrating the characteristic of the MTF with respect to the field angle at the frequency of 7.87 line pairs/mm on the original surface in a lens having another numerical configuration.

FIG. 18 shows the characteristic of the MTF with respect to the field angle at the spatial frequency of 7.87 line pairs/mm on the original surface. In this drawing, the object height constituting a factor determining the field angle is taken as the abscissa, and the MTF is taken as the ordinate. As shown in the drawing, with respect to the three colors of B, G, and R, the respective MTF's are very uniformalized in spite of the change in the object height (relative magnitude of the field angle) (ΔMTF is within 20%).

Figure 19:
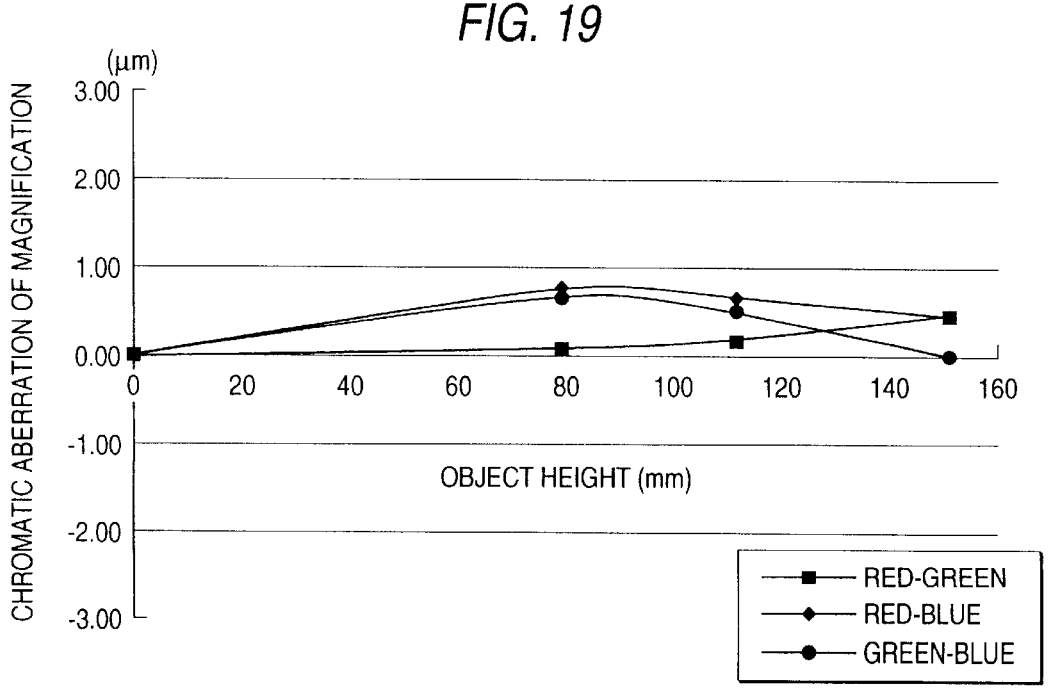
FIG. 19 is a diagram illustrating the characteristic of the chromatic aberration of magnification with respect to the field angle in the lens having another numerical configuration.

In addition, with respect to the characteristic of the chromatic aberration of magnification with respect to the field angle, it can be seen that the chromatic aberration of magnification is kept within 1 mm, as shown in FIG. 19.

Consequently, an image-forming optical system in which the chromatic aberration of magnification is kept within 1 mm and the difference in the MTF (ΔMTF) is small is realized by the combination of the lens having the characteristics shown in Table 2 and the sagittal stopper.

As described above, in accordance with the image reading apparatus of the present invention, by adopting the lens having a resolution characteristic in which the resolution in the vertical scanning direction in the image-reading wavelength region at the field angle in the vicinity of the original's end is lower than a minimum resolution in the image-reading wavelength region at the field angle on the inner side of the vicinity of the original's end, the longitudinal chromatic aberration and the chromatic aberration of magnification, as well as the curvature of field, astigmatism, distortion, and the like can be suppressed to low levels as practically as possible. The declined portion of the resolution in the vertical scanning direction in the vicinity of the original's end is raised up to a necessary resolution by shielding part of that reflected light by the light shielding means such that the entrance pupil in the vertical scanning direction becomes small when the reflected light from the vicinity of the original's end is incident upon the lens. Therefore, it is possible to improve the resolution characteristic of the image-forming optical system as a whole while minimizing the loss in the amount of reflected light from the original.

The entire disclosure of each and every foreign patent aplication from which the benefit of foreign priority has been claimed in the present application is incorporated herein by reference, as if fully set forth.

While only certain embodiment of the invention have been specifically described herein, it will apparent that numerous modification may be made thereto without departing from the spirit and scope of the invention.

What is claimed is:

1. An image reading apparatus comprising:

illuminating means for illuminating an original with light;

a lens forming an image of reflected light from the original, said lens having a resolution characteristic in which a resolution in a vertical scanning direction in an image-reading wavelength region at a field angle in a vicinity of an end of the original is lower than a minimum resolution in an image-reading wavelength region at a field angle on an inner side of the vicinity of the end of the original;

light shielding means for shielding part of the reflected light such that a pupil diameter in the vertical scanning direction in the reflected light from the vicinity of the end of the original is reduced; and photoelectrically converting means for converting the reflected light partly shielded by said light shielding means and undergone image formation by said lens into an electrical signal.

2. The image reading apparatus according to claim 1, wherein said lens has said resolution characteristic at a spatial frequency of approximately 5 lines/mm on a surface of the original.

3. The image reading apparatus according to claim 1, wherein said image-reading wavelength region includes at least two or more wavelength regions of ultraviolet, blue, green, red, and infrared.

4. The image reading apparatus according to claim 1, wherein an increased portion of the resolution in the image-reading frequency region at the field angle in the vicinity of the end of the original due to said light shielding means is set to an equivalent to a difference between the resolution in the vertical scanning direction in the image-reading wavelength region at the field angle in the vicinity of the end of the original and a minimum resolution in the image-reading wavelength region at the field angle on the inner side of the vicinity of the end of the original.

5. The image reading apparatus according to claim 1, wherein said lens is a Gauss-type lens having a four-group, six-element arrangement which is comprised of, in order from an object side:

a first lens which is a positive meniscus lens whose convex surface faces the object side;

a second lens which is a positive meniscus lens whose convex surface faces the object side;

a third lens which is a negative meniscus lens whose concave surface faces the object side;

a diaphragm;

a fourth lens which is a negative meniscus lens whose concave surface faces the object side;

a fifth lens; and a sixth lens, wherein said second lens and said third lens are cemented together, said fourth lens and said fifth lens are cemented together.

6. The image reading apparatus according to claim 5, wherein each of said first, second, fifth, and sixth lenses is structured by optical glass whose Abbe numbers at a d-line are more than or equal to 47.

7. The image reading apparatus according to claim 5, wherein a refractive index each of said first and sixth lenses is greater than or equal to 1.65.

8. The image reading apparatus according to claim 6, wherein optical glass of an identical material is used as said first, second, fifth, and sixth lenses, respectively.

9. The image reading apparatus according to claim 6, wherein assuming that ri is a radius of curvature of an i-th surface, di is an interval between the i-th surface and an (i+1)th surface, ni is a refractive index at the d-line of an i-th lens, and vi is the Abbe number at the d-line of the i-th lens, said lens satisfies a condition that:

r1=31.55, r2=79.76, r3=24.32, r4=51.57, r5=16.55, r6=−16.10, r7=−104.8, r8=−22.70, r9=−165.0, r10=−37.25, d1=5.77, d2=0.10, d3=7.19, d4=0.95, d5=22.36, d6=0.95, d7=6.65, d8=0.16, d9=4.47, n1=1.639, n2=1.639, n3=1.648, n4=1.603, n5=1.639, n6=1.639, ν1=55.5, ν2=55.5, ν3=33.8, ν4=38.0, ν5=55.5, and ν6=47.5.

10. The image reading apparatus according to claim 7, wherein assuming that ri is a radius of curvature of an i-th surface, di is an interval between the i-th surface and an (i+1)th surface, ni is a refractive index at the d-line of an i-th lens, and νi is the Abbe number at the d-line of the i-th lens, said lens satisfies a condition that:

r1=31.80, r2=78.41, r3=23.70, r4=61.77, r5=16.38, r6=−16.59, r7=−538.0, r8=−23.80, r9=−160.5, r10=−39.00, d1=5.1, d2=0.11, d3=7.26, d4=0.90, d5=22.77, d6=0.90, d7=6.98, d8=0.11, d9=4.87, n1=1.658, n2=1.639, n3=1.648, n4=1.603, n5=1.639, n6=1.670, ν1=50.9, ν2=55.5, ν3=33.8, ν4=38.0, ν5=55.5, and ν6=47.3.

11. The image reading apparatus according to claim 1, wherein a difference between a maximum resolution and a minimum resolution of the reflected light undergone image formation by said lens is less than or equal to 25% within an entire field angle on the original.

12. The image reading apparatus according to claim 1, wherein said lens is structured such that a deviation between a center of gravity of image formation at the wavelength of a G color and the center of gravity of image formation at wavelengths of other colors which have been-read is less than or equal to 10% of a pixel.

\* \* \* \* \*